(12) United States Patent
Iwai et al.

(10) Patent No.: US 12,150,111 B2
(45) Date of Patent: Nov. 19, 2024

(54) BASE STATION, TRANSMISSION METHOD, AND RECEPTION METHOD

(71) Applicant: Panasonic Intellectual Property Corporation of America, Torrance, CA (US)

(72) Inventors: Takashi Iwai, Ishikawa (JP); Tomofumi Takata, Ishikawa (JP); Yoshio Urabe, Nara (JP); Takayuki Nakano, Ishikawa (JP); Jun Minotani, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 317 days.

(21) Appl. No.: 17/627,616

(22) PCT Filed: Jul. 10, 2020

(86) PCT No.: PCT/JP2020/027106
§ 371 (c)(1),
(2) Date: Jan. 14, 2022

(87) PCT Pub. No.: WO2021/020083
PCT Pub. Date: Feb. 4, 2021

(65) Prior Publication Data
US 2022/0272715 A1    Aug. 25, 2022

(30) Foreign Application Priority Data
Jul. 30, 2019  (JP) .................................. 2019-139824

(51) Int. Cl.
*H04W 72/121* (2023.01)
*H04W 72/0453* (2023.01)
(Continued)

(52) U.S. Cl.
CPC ..... *H04W 72/121* (2013.01); *H04W 72/0453* (2013.01); *H04W 72/1263* (2013.01); *H04W 72/23* (2023.01)

(58) Field of Classification Search
CPC ............... H04W 72/121; H04W 72/23; H04W 72/0453; H04W 72/1263
See application file for complete search history.

(56) References Cited

U.S. PATENT DOCUMENTS 10,219,271 B1   2/2019  Hedayat et al.
2016/0330715 A1* 11/2016  Chen ..................... H04W 72/04
(Continued)

FOREIGN PATENT DOCUMENTS

JP    2019-503151 A    1/2019
JP    2019-139824 A    8/2019
(Continued)

OTHER PUBLICATIONS

Extended European Search Report, dated Jul. 15, 2022, for European Patent Application No. 20846094.9-1215. (9 pages).
(Continued)

*Primary Examiner* — Duc C Ho
(74) *Attorney, Agent, or Firm* — Seed IP Law Group LLP

(57) ABSTRACT

The present invention enables more efficient control of Multi-AP coordination. A base station, according to the present invention, comprises: a control circuit that generates shared information that is shared among a plurality of users and includes information pertaining to unassigned resources, and individual user information specific to each of the plurality of users; and a transmission circuit that transmits a control signal comprising the shared information and the individual user information.

9 Claims, 18 Drawing Sheets

(51) Int. Cl.
*H04W 72/1263* (2023.01)
*H04W 72/23* (2023.01)

(56) References Cited

U.S. PATENT DOCUMENTS

| | | |
|---|---|---|
| 2016/0353322 A1 | 12/2016 | Li et al. |
| 2017/0142766 A1* | 5/2017 | Kim ................. H04W 36/0055 |
| 2018/0302858 A1 | 10/2018 | Son et al. |
| 2019/0252024 A1 | 8/2019 | Watanabe |
| 2019/0387549 A1 | 12/2019 | Iwai et al. |

FOREIGN PATENT DOCUMENTS

| | | |
|---|---|---|
| WO | WO 2017030342 A1 | 2/2017 |
| WO | WO 2018128042 A1 | 7/2018 |

OTHER PUBLICATIONS

Ahn et al., "Coordinated Transmission Scheme for 11be," IEEE 802.11-19/927r0, May 16, 2019. (8 pages).

International Search Report, mailed Oct. 13, 2020, for International Application No. PCT/JP2020/027106. With English translation. (5 pages).

LAN/MAN Standards Committee, "IEEE P802.11ax/D4.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE Computer Society, Feb. 2019. (746 pages).

* cited by examiner

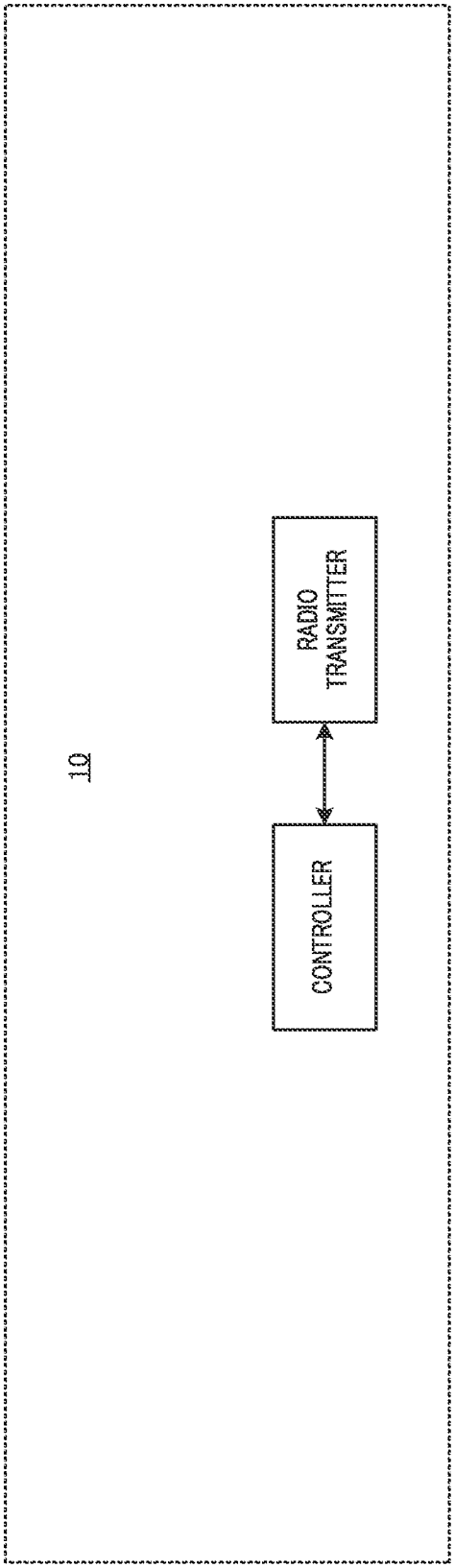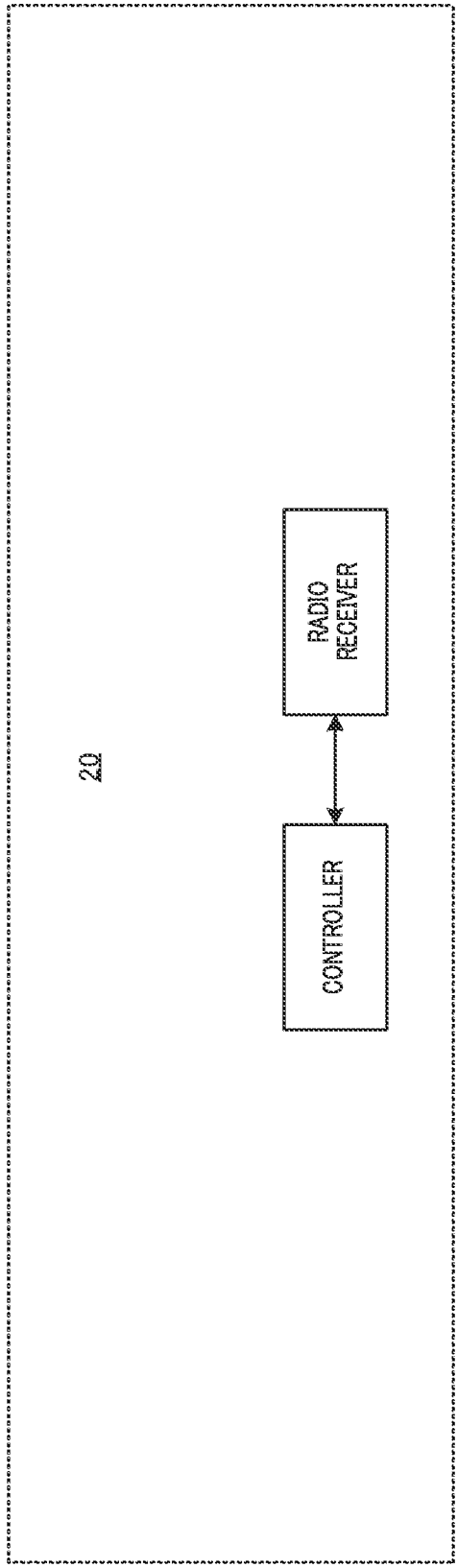

| N bits indices | #1 | #2 | #3 | #4 | #5 | #6 | #7 | #8 | #9 |
|---|---|---|---|---|---|---|---|---|---|
| 000⋯000 | 26 | 26 | 26 | 26 | 26 | 26 | 26 | 26 | 26 |
| 000⋯001 | 26 | 26 | 26 | 26 | 26 | 26 | 26 | 52 | |
| 000⋯010 | 26 | 26 | 26 | 26 | 26 | 52 | | 26 | 26 |
| 000⋯011 | 26 | 26 | 26 | 26 | 26 | | 52 | | 52 |

PATTERN 0
PATTERN 1
PATTERN 2
PATTERN 3

FIG. 8

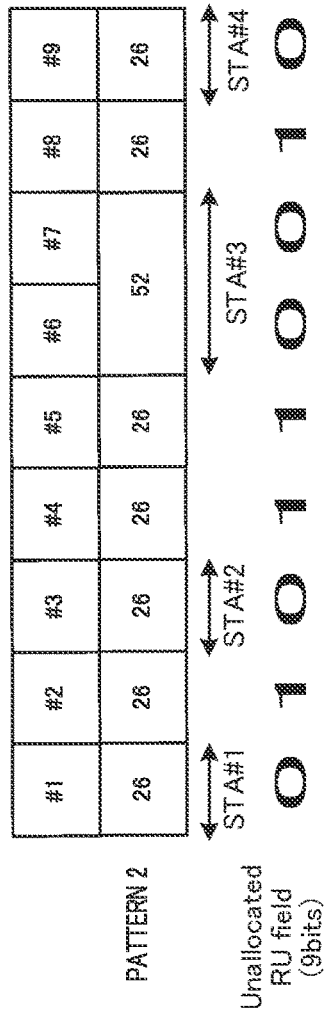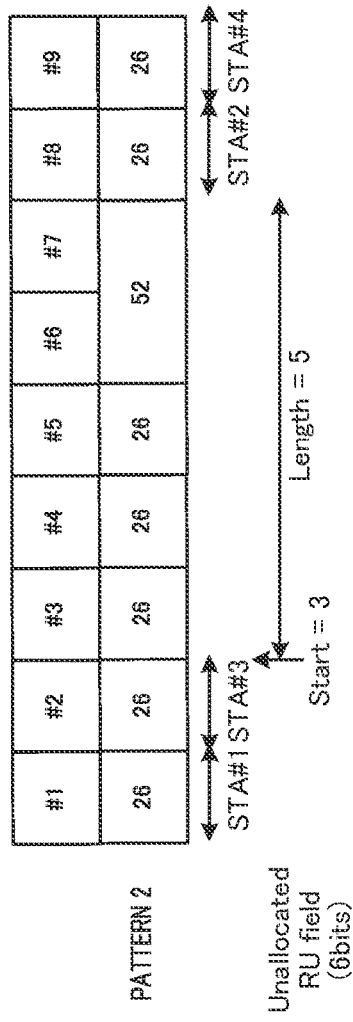
FIG. 10
FIG. 11

| N bits indices | #1 | #2 | #3 | #4 | #5 | #6 | #7 | #8 | #9 |
|---|---|---|---|---|---|---|---|---|---|
| 000 ·· 000 | 26 | 26 | 26 | 26 | 26 | 26 | 26 | 26 | 26 |
| ··· | | | | | ··· | | | | |
| XXX ·· 000 | 26 | Unallocated | 26 | Unallocated | 26 | Unallocated | 26 | Unallocated | 26 |
| XXX ·· 001 | Unallocated | 26 | Unallocated | 26 | Unallocated | 26 | Unallocated | 26 | Unallocated |
| XXX ·· 010 | Unallocated | 26 | 26 | 26 | Unallocated | 26 | 26 | 26 | Unallocated |
| XXX ·· 011 | 26 | Unallocated | Unallocated | 52 | 26 | 26 | Unallocated | Unallocated | 26 |
| XXX ·· 100 | Unallocated | 26 | Unallocated | Unallocated | 52 | Unallocated | 52 | Unallocated | Unallocated |
| XXX ·· 101 | Unallocated | 26 | 26 | 26 | Unallocated | Unallocated | Unallocated | 26 | 26 |
| ··· | | | | | ··· | | | | |

FIG. 16

| N bits indices | #1 | #2 | #3 | #4 | #5 | #6 | #7 | #8 | #9 |
|---|---|---|---|---|---|---|---|---|---|
| 000 .. 000 | 26 | 26 | 26 | 26 | 26 | 26 | 26 | 26 | 26 |
| ... | | | | | | | | | |
| XXX .. 000 | 26 | 26 | 26 | 26 | 26 | 26 | Unallocated | | |
| XXX .. 001 | 26 | 52 | | 26 | 26 | Unallocated | | | 26 |
| XXX .. 010 | 26 | 26 | 26 | 52 | | 26 | 26 | 26 | 26 |
| XXX .. 011 | 26 | Unallocated | | | 26 | 26 | 26 | 26 | 26 |
| XXX .. 100 | Unallocated | | | | | 52 | | 52 | |
| XXX .. 101 | Unallocated | | | | | 26 | 26 | 26 | 26 |
| ... | | | | | | | | | |

FIG. 17

BASE STATION, TRANSMISSION METHOD, AND RECEPTION METHOD

TECHNICAL FIELD

The present disclosure relates to a base station, a transmission method, and a reception method.

BACKGROUND ART

A Task Group (TG) has been working to establish technical specifications of IEEE 802.11be (hereinafter referred to as "11be") as a succeeding standard of IEEE 802.11ax (hereinafter referred to as "11ax") which is a standard of the Institute of Electrical and Electronics Engineers (IEEE) 802.11.

In 11be, Multi-AP coordination in which a plurality of access points (each of which is also referred to as "base station" and will be referred to as "AP (Access Point)" hereinafter) performs coordinated data transmission has been discussed as a technique for improving throughput (for example, see Non-Patent Literature (hereinafter referred to as "NPL") 1).

CITATION LIST

Non-Patent Literature

NPL 1
 IEEE 802.11-19/927r0, Coordinated Transmission Scheme for 11be, May 16, 2019
NPL 2
 IEEE P802.11ax/D4.0, Draft Standard for Information technology, February 2019

SUMMARY OF INVENTION

Technical Problem

However, methods of controlling Multi-AP coordination in radio communication such as a wireless local area network (WLAN) have not been sufficiently discussed.

One non-limiting and exemplary embodiment facilitates providing a base station, a transmission method, and a reception method that are capable of achieving more efficient control of Multi-AP coordination.

A base station according to an embodiment of the present disclosure includes: control circuitry, which, in operation, generates common information and user specific information; and transmission circuitry, which, in operation, transmits a control signal including the common information and the user specific information. The common information is information common to a plurality of users and including information on an unallocated resource. The user specific information is specific to each of the plurality of users.

It should be noted that general or specific embodiments may be implemented as a system, a method, an integrated circuit, a computer program, a storage medium, or any selective combination thereof.

According to an embodiment of the present disclosure, it is possible to achieve more efficient control of Multi-AP coordination.

Additional benefits and advantages of the disclosed embodiments w % ill become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 4 is a block diagram illustrating a configuration example of part of a downlink radio transmission apparatus according to an embodiment of the present disclosure;

FIG. 5 is a block diagram illustrating a configuration example of part of a downlink radio reception apparatus according to the embodiment of the present disclosure;

FIG. 8 illustrates an example of a list of resource unit (RU) allocation pattern candidates.

FIG. 10 illustrates a first example of unallocated RU information;

FIG. 11 illustrates a second example of unallocated RU information;

FIG. 16 illustrates a first example of a list of RU allocation pattern candidates in Embodiment 2;

FIG. 17 illustrates a second example of a list of RU allocation pattern candidates in Embodiment 2;

DESCRIPTION OF EMBODIMENTS

Hereinafter, embodiments of the present disclosure will be described in detail with reference to the accompanying drawings.

Embodiment 1

[Multi-User (MU) Transmission]

For example, 11ax supports multi-user (MU) transmission. Examples of the MU transmission include downlink MU-multiple input multiple output (DL MU-MIMO), DL orthogonal frequency division multiple access (DL OFDMA), and the like.

In the case of DL MU-MIMO or DL OFDMA, an access point (AP, or also referred to as "base station") notifies each STA (also referred to as "station (STA)" or "terminal") of control information by using a control signal (for example, referred to as "SIG-B" or "SIG-B field") of a preamble included in a DL multi-user physical layer convergence procedure protocol data unit (DL MU PPDU), for example.

Figures 1, 2:
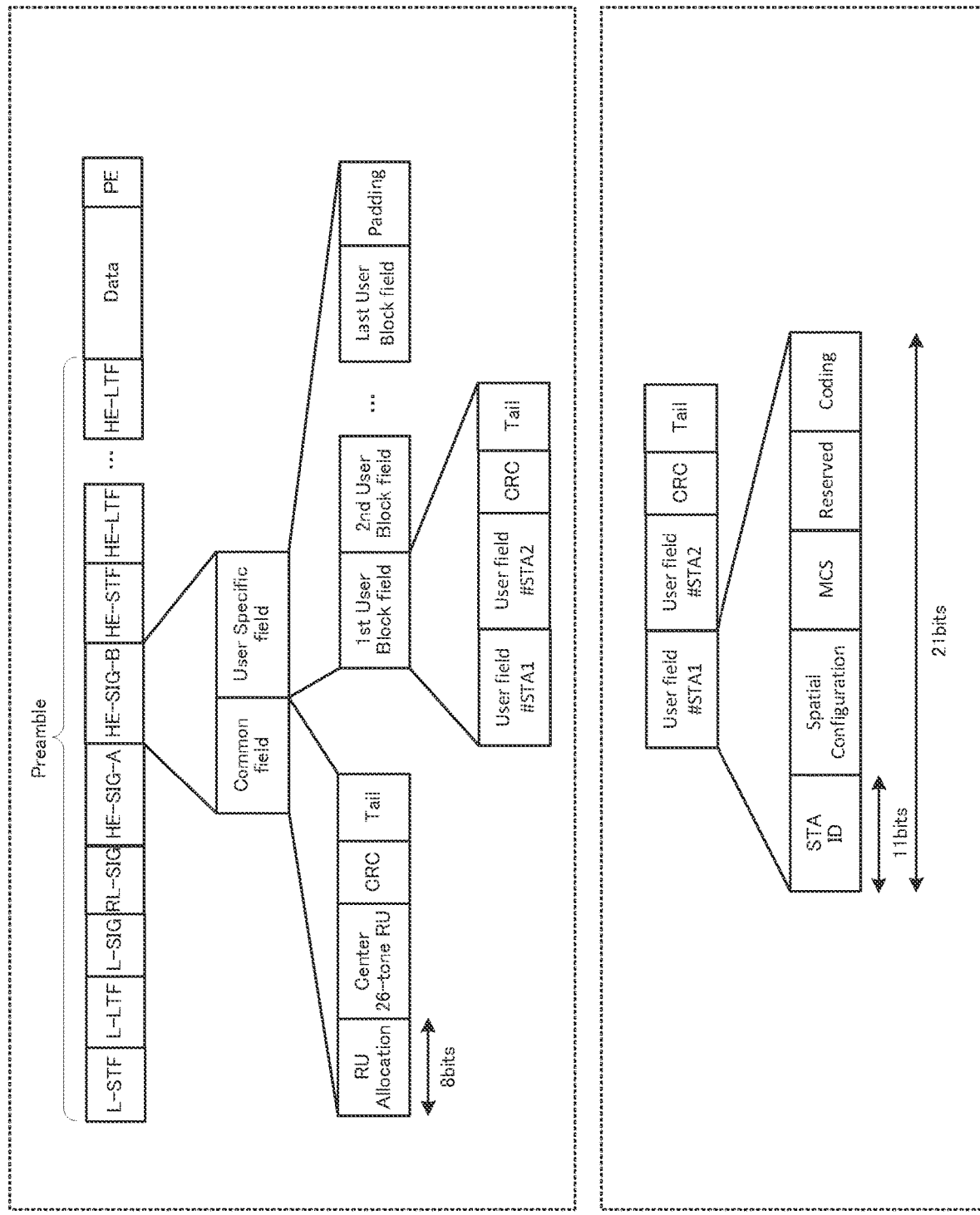
FIG. 1 illustrates an example of a format of SIG-B included in a downlink control signal 1.
FIG. 2 illustrates a configuration example of a user field of the SIG-B 2.

FIG. 1 illustrates a configuration example of HE-SIG-B (hereinafter simply referred to as "SIG-B") of a high efficiency MU PPDU (HE MU PPDU (hereinafter simply referred to as "MU PPDU")) that instructs downlink MU transmission in 11ax. FIG. 1 illustrates an example of a format of a preamble to be attached to data. Further, FIG. 1 illustrates a configuration example of the SIG-B among fields included in the format of the preamble.

As illustrated in FIG. 1, the SIG-B includes a "common field" including information common to a plurality of users (in other words, STAs) (hereinafter, the information will be referred to as "common information" or "STA common information") and a "user specific field" including information for each user (hereinafter referred to as "user information", "STA specific information", or "user specific information").

In the common field, an allocation pattern of RUs (hereinafter referred to as "RU allocation pattern") to be allocated to each user in a channel bandwidth (e.g. a channel band) of an AP is notified in a resource unit (RU) allocation subfield, for example. For example, the RU allocation subfield has a size of 8 bits.

Further, the user specific field includes at least one user block field, for example. Each user block field is a field obtained by encoding a user field(s) of one or two users with a block check character (BCC). Further, the order of arrangement of user fields corresponding to each user in the user specific field illustrated in FIG. 1 may be defined based on the RU allocation subfield of the common field. For example, a user field may be associated with an RU included in an RU allocation pattern. Further. HE-SIG-A is STA common information and includes control information for demodulating and decoding HE-SIG-B.

FIG. 2 illustrates a configuration example of a user field of the SIG-B. As illustrated in FIG. 2, the user field is, for example, a field for notifying information for each user (STA) including STA #1 and STA #2. The user field may be interpreted as a field that notifies STA information. The user field includes, for example, information on an "STA ID subfield" indicating the identifier of a user (STA), a "spatial configuration subfield" indicating spatial stream allocation information, a "modulation and channel coding scheme (MCS) subfield" indicating a modulation and coding scheme, a "coding subfield" indicating an encoding method, and the like. For example, in a case where a channel bandwidth is 20 MHz or 40 MHz, the sizes of the STA ID subfield and the user field are 11 bits and 21 bits, respectively.

[Multi-AP Coordination]

In Multi-AP coordination, scheduling coordinated among a plurality of APs and dynamic coordinated operation of transmission timing and transmission bandwidth are performed. This coordinated operation, for example, reduces an effect of interference occurring between adjacent APs (for example, a cell edge) and improves throughput.

For example, as an example of Multi-AP coordination, coordinated OFDMA (also referred to as "dynamic point selection (DPS)") has been discussed (for example, see NPL 1).

Figure 3A:
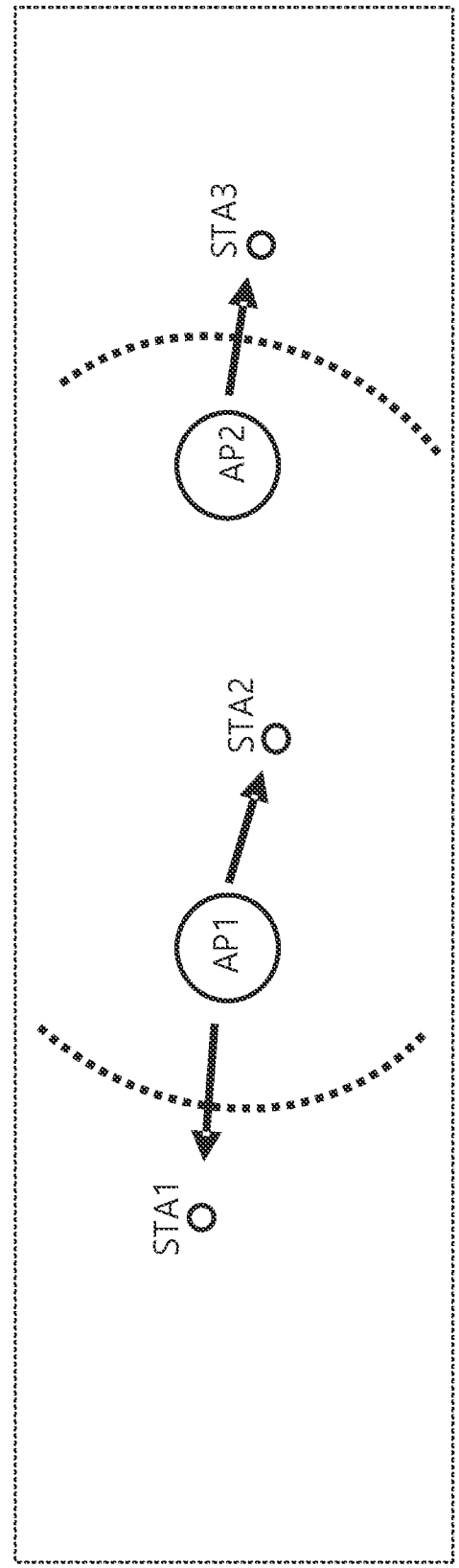
FIG. 3A illustrates an example of two APs performing coordinated operation of coordinated OFDMA.
Figure 3B:
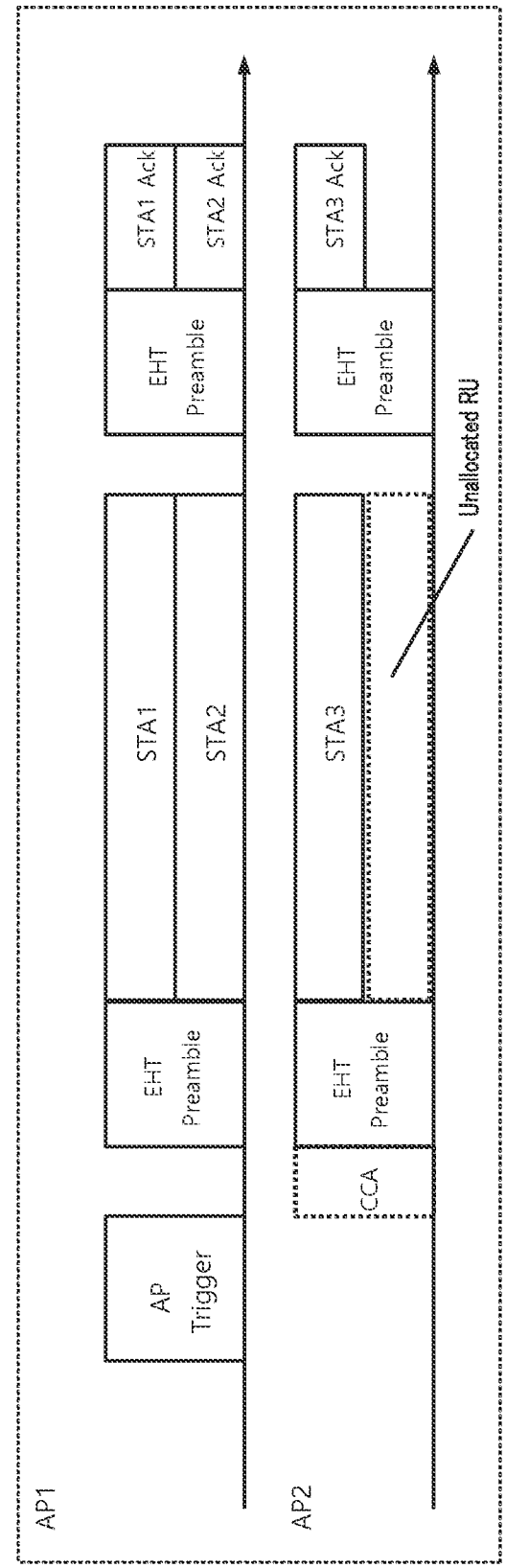
FIG. 3B illustrates an example of resource allocation in the two APs illustrated in FIG. 3A.

FIG. 3A illustrates an example of two APs performing coordinated operation of coordinated OFDMA. FIG. 3B illustrates an example of resource allocation in the two APs illustrated in FIG. 3A. FIG. 3A illustrates two APs (AP1 and AP2) and three STAs (STA1, STA2, and STA3). AP and AP2 are an example of APs adjacent to each other.

In FIG. 3A, STA1 and STA2 perform radio communication with AP1, and STA3 performs radio communication with AP2. Further, in FIG. 3A, STA2 is located at a cell edge between AP1 and AP2. FIG. 3B illustrates an example of resource allocations in AP1 and AP2, respectively.

In coordinated OFDMA, a plurality APs performs coordinated operation. At the time of data transmission to a certain user (STA), however, coordinated OFDMA dynamically switches from the plurality of APs to an AP with good communication quality.

For example, an adjacent AP, which serves as a major source of interference for an STA that transmits data, reduces an effect of interference and improves throughput of the STA by configuring, to be an unallocated RU, an RU which has been allocated to the STA. In the example of FIGS. 3A and 3B, AP2 adjacent to AP1 which is the communication partner of STA2 is a source of interference for STA2 located at the cell edge. In this example, as illustrated in FIG. 3B, an RU, which is allocated to STA2 in AP1 and is used for data transmission between STA2 and AP1, is set to be a RU allocated to no STA (unallocated RU) in AP2. This reduces an effect of interference from AP2 and improves throughput of STA2.

Here, the "unallocated RU" refers to, in AP1, for example, an RU that is allocated to none of the STAs within the coverage of AP1, whereas the "allocated RU" refers to, in AP1, for example, an RU that is allocated to one of the STAs within the coverage of AP1. For example, an RU to be set as an "unallocated RU" in AP1 may be an "allocated RU" in another AP (for example, AP2).

In downlink MU transmission using the HE MU PPDU in 11ax, setting an ID of a certain STA (for example, STA1) to an STA ID included in a user field of the SIG-B makes it possible to notify that the RU associated with the user field is an RU allocated to STA1 (allocated RU of STA1). Then, setting an unused associated ID (AID) (for example, "2046") to an STA ID included in a user field of the SIG-B makes it possible to notify that the RU associated with the user field is an unallocated RU (for example, see NPL 2).

To improve throughput in coordinated OFDMA and/or DPS, an AP that performs coordinated transmission needs to dynamically schedule allocated and unallocated RUs in accordance with channel qualities of a plurality of STAs within the coverage of the AP and to notify the plurality of STAs within the coverage of the AP.

In a case where an unallocated RU is notified by using the HE MU PPDU in 11ax, however, a user field (21 bits in the example of FIG. 2) including an STA ID field, to which an unused AID is set, and having the same size as a user field in a case where an allocated RU is notified is notified. Although a user field including an STA ID field, to which an unused AID is set, is a user field associated with an unallocated RU, that is, an RU that does not use any STA, the user field includes a subfield of information on signal transmission (for example, "spatial configuration subfield" or the like) so that signaling is wasted. Accordingly, in a case where Multi-AP coordination is applied in 11be, dynamic notifications of an unallocated RU from APs increase, and control information overhead in the HE MU PPDU increases.

Further, in 11 be, it has been discussed to extend the maximum channel bandwidth from 160 MHz to 320 MHz. The RU allocation pattern information (RU allocation subfield) included in the SIG-B is notified every 20 MHz so that as the channel bandwidth increases, signaling overhead increases due to an effect of a user field that notifies an unallocated RU.

Note that, an STA performs decoding processing for each user block field and extracts a user field. For example, in a case where an AP sets a user field associated with an unallocated RU as a user field including an STA ID field, to which an unused AID is set, and including no subfield of another information on signal transmission (for example, a "spatial configuration subfield" or the like) in order to reduce overhead, the size of a user block field changes. Since an STA is incapable of grasping the size of a user block field prior to decoding, the STA may be incapable of decoding a user block field correctly. Alternatively, in a case where an STA attempts to perform decoding processing of a user block field having a variable size in all size patterns to be assumed for the user block field for the sake of correct decoding, processing load of the STA increases.

Accordingly, since even a user field associated with an unallocated RU has a fixed size in the same manner as in the size of a user field associated with an allocated RU, signaling overhead increases.

Given the above, in an embodiment of the present disclosure, a method of properly controlling Multi-AP coordination processing and reducing signaling overhead in MU transmission will be described.

[Configuration of Radio Communication System]

A radio communication system according to Embodiment 1 of the present disclosure includes at least one AP and a plurality of STAs.

For example, in DL communication (for example, transmission and reception of DL data), the AP (also referred to as "downlink radio transmission apparatus") performs downlink MU transmission of DL signals to the plurality of STAs (also referred to as "downlink radio reception apparatuses"). Each STA receives a DL signal for the STA from a signal transmitted by downlink MU transmission.

[Configuration Example of Radio Communication System Relating to DL Communication]

First, a configuration example of a radio communication system relating to DL communication will be described. The radio communication system relating to DL communications includes, for example, downlink radio transmission apparatus 10 (for example, an AP) and downlink radio reception apparatus 20 (for example, an STA).

Downlink radio transmission apparatus 10 transmits, for example, a control signal (for example, SIG-B) of a preamble, which includes common information and user information, and a DL data signal, which is set based on a control signal, to downlink radio reception apparatus 200. Downlink radio reception apparatus 20 receives the control signal and the DL data signal that are transmitted from downlink radio transmission apparatus 10. Note that, the preamble may be included in, for example, a physical data channel for MU transmission (for example, MU PPDU).

FIG. 4 is a block diagram illustrating a configuration example of part of downlink radio transmission apparatus 10 according to an embodiment of the present disclosure. In downlink radio transmission apparatus 10 illustrated in FIG. 4, a controller generates common information (for example, information in a common field) common to a plurality of users and including information on an unallocated resource, and user specific information (for example, information in a user specific field) specific to each of the plurality of users, and a radio transmitter transmits a control signal (for example, the SIG-B) including the common information and the user specific information.

FIG. 5 is a block diagram illustrating a configuration example of part of downlink radio reception apparatus 20 according to the embodiment of the present disclosure. In downlink radio reception apparatus 20 illustrated in FIG. 5, a radio receiver receives a control signal that includes common information (for example, information in a common field) common to a plurality of users and including information on an unallocated resource, and user specific information (for example, information in a user specific field) specific to each of the plurality of users, and a controller determines, based on the information on the unallocated resource, a resource allocated to downlink radio reception apparatus 20 (for example, a terminal or an STA).

[Configuration Example of Downlink Radio Transmission Apparatus 100]

Figure 6:
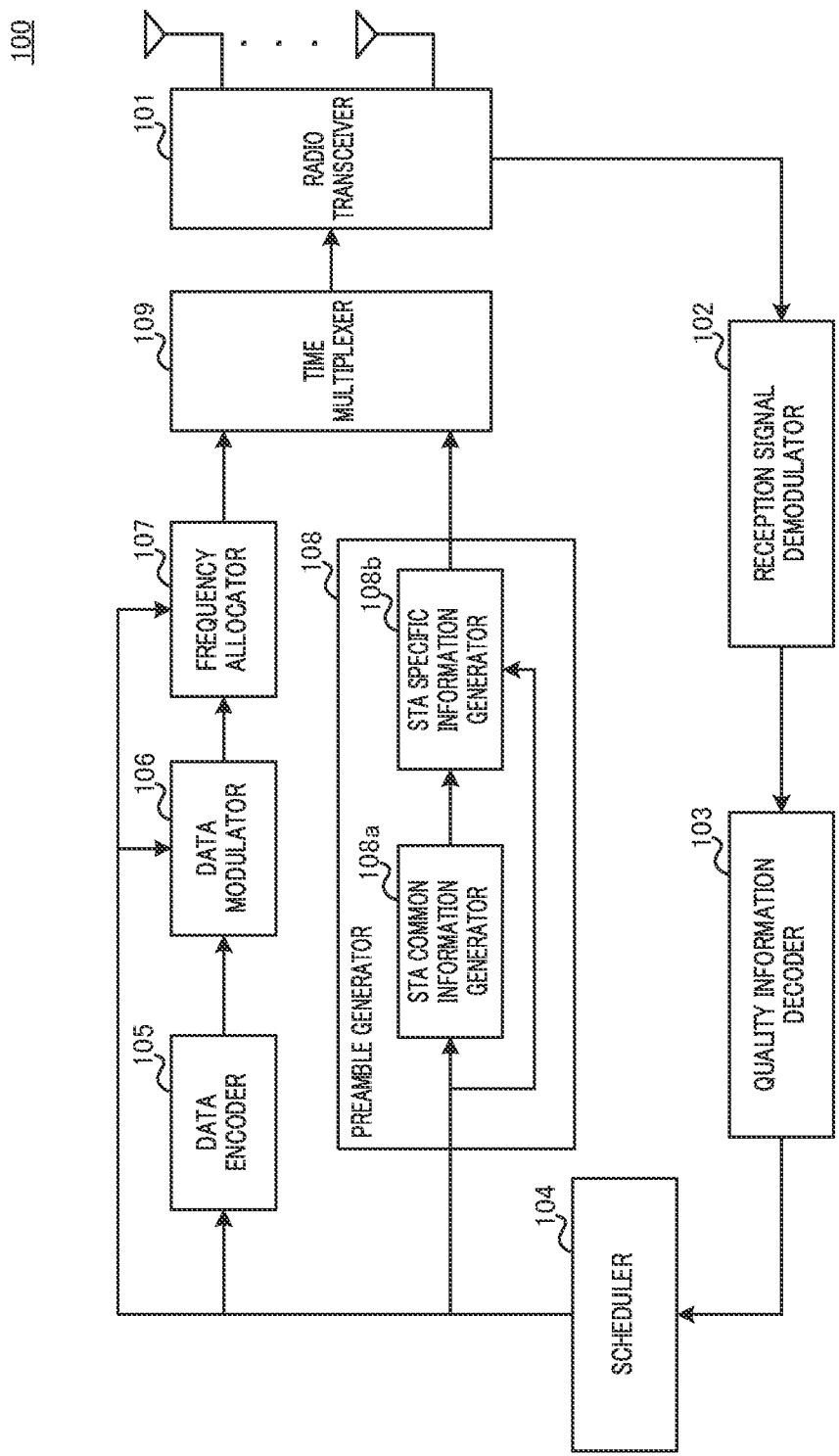
FIG. 6 is a block diagram illustrating a configuration example of a downlink radio transmission apparatus according to Embodiment 1; 3

FIG. 6 is a block diagram illustrating a configuration example of downlink radio transmission apparatus 100 (hereinafter referred to as "AP 100") according to Embodiment 1.5 AP 100 illustrated in FIG. 6 includes, for example, radio transceiver 101, reception signal demodulator 102, quality information decoder 103, scheduler 104, data encoder 105, data modulator 106, frequency allocator 107, preamble generator 108, and time multiplexer 109.

For example, AP 100 illustrated in FIG. 6 is an example of downlink radio transmission apparatus 10 illustrated in FIG. 4. The controller illustrated in FIG. 4 may correspond to a processor (such as scheduler 104 and preamble generator 108, for example) relating to the generation of a control signal in FIG. 6. Further, the radio transmitter illustrated in FIG. 4 may correspond to, for example, radio transceiver 101 illustrated in FIG. 6.

Radio transceiver 101 receives a signal transmitted from downlink radio reception apparatus 200 (see FIG. 7, for example, STA 200) via an antenna, and performs radio reception processing including a down-conversion, an analog/digital (A/D) conversion, and the like on the reception signal. For example, radio transceiver 101 extracts reception data including quality information from the reception signal subjected to the radio reception processing, and outputs the reception data to reception signal demodulator 102. Further, radio transceiver 101 performs radio transmission processing including a digital/analog (D/A) conversion, a frequency up-conversion to a carrier frequency, and the like on a signal (for example, MU PPDU) obtained by time-multiplexing a preamble and data and inputted from time multiplexer 109. Then, radio transceiver 101 transmits the signal subjected to the radio transmission processing to STA 200 via an antenna. The signal transmitted from STA 200 may include, for example, a preamble (preamble signal, or also referred to as "preamble section"), and data (data signal, or also referred to as "data section").

Reception signal demodulator 102 performs processing including a fast Fourier transform (FFT) and the like on a signal inputted from radio transceiver 101, and demodulates data based on control information and a channel estimation result that are included in a preamble (also referred to as "PPDU header") of the reception signal. Reception signal demodulator 102 outputs the demodulated data signal to quality information decoder 103.

Quality information decoder 103 decodes radio quality information of STA 200 from a reception signal inputted from reception signal demodulator 102. The radio quality information may be, for example, channel information (for example, frequency response) for each predetermined frequency resource, may be a signal-to-noise ratio (SNR), or may be a reception level. Quality information decoder 103 outputs the decoded radio quality information to scheduler 104.

Scheduler 104 performs scheduling on STA 200 based on radio quality information for each STA 200 inputted from quality information decoder 103, for example. Further, scheduler 104 determines the number of STAs to be MU-multiplexed (the number of terminals or a user multiplex number), an MCS of DL data for each STA, an encoding method, allocated RUs, and a frequency bandwidth. Further, in a case where Multi-AP coordination or the like is used, scheduler 104 determines an RU, which is assumed to exhibit a large effect of interference to another STA, as an unallocated RU. Here, the other STA may be, for example, an STA that is wirelessly connected to an AP adjacent to AP 100 itself. Further, the unallocated RU corresponds to, for example, an RU that is not allocated to an STA which is wirelessly connected to AP 100 itself.

Scheduler 104 outputs scheduling information indicating a scheduling result to data encoder 105, data modulator 106, frequency allocator 107, and preamble generator 108.

Data encoder 105 encodes a data sequence (DL data) addressed to STA 200 based on scheduling information (for example, an encoding method or an MCS) inputted from scheduler 104. Data encoder 105 outputs the encoded data to data modulator 106.

Data modulator 106 modulates encoded data inputted from data encoder 105 based on scheduling information (for example, a frequency resource or an MCS) inputted from scheduler 104. Data modulator 106 outputs the modulated data to frequency allocator 107.

Frequency allocator 107 maps modulated data inputted from data modulator 106 to an RU allocated to STA 200 based on scheduling information (for example, frequency allocation information) inputted from scheduler 104. Then, frequency allocator 107 performs inverse fast Fourier transform (IFFT) processing, and generates an OFDM signal. Frequency allocator 107 outputs the OFDM signal to time multiplexer 109.

Preamble generator 108 includes STA common information generator 108a and STA specific information generator 108b. Preamble generator 108 generates a preamble including STA common information and STA specific information based on scheduling information (for example, the number of transmission terminals, an encoding method, an MCS, and frequency allocation (including an unallocated RU)) inputted from scheduler 104. Preamble generator 108 outputs the generated preamble to time multiplexer 109. The STA common information may include information on an unallocated RU (unallocated RU information). The information on an unallocated RU may be information that explicitly or implicitly indicates (specifies) the unallocated RU.

STA common information generator 108a generates, based on scheduling information, control information common to STAs to be MU-multiplexed. The control information common to STAs to be MU-multiplexed corresponds to STA common information. The STA common information includes, for example, an RU allocation pattern and unallocated RU information for STA 200 multiplexed in a channel bandwidth.

The RU allocation pattern indicates, for example, each size of at least one RU defined in a channel bandwidth, and allocation (for example, order of arrangement) of at least one RU in the channel bandwidth. For example, an RU allocation pattern is selected from among a plurality of RU allocation pattern candidates.

Note that, the method of generating unallocated RU information will be described later.

STA specific information generator 108b generates, based on scheduling information, control information specific to each STA for allocating frequency resources. The control information specific to each STA corresponds to STA specific information. The STA specific information includes, for example, an STA ID, an MCS, and the like. Note that, STA specific information on each STA 200 to be MU-multiplexed is notified by using a user field. The order of allocation (order of arrangement) of user fields for each STA 200 in a preamble (for example, HE MU PPDU) may be defined in accordance with an RU allocation pattern. For example, user fields are arranged in accordance with the order of, among RUs of an RU allocation pattern. RUs except an unallocated RU(s) (that is, allocated RUs).

STA specific information generator 108b generates a preamble by adding STA specific information to STA common information outputted from STA common information generator 108a, and outputs the generated preamble to time multiplexer 109.

Time multiplexer 109 generates a transmission signal (for example, MU PPDU signal) by time-multiplexing a preamble outputted from preamble generator 108 and a data signal outputted from frequency allocator 107. For example, in time multiplexing, the data signal is multiplexed after the preamble in a time direction. Time multiplexer 109 outputs the transmission signal to radio transceiver 101.

Radio transceiver 101 performs radio transmission processing including a D/A conversion, a frequency up-conversion to a carrier frequency, and the like on a transmission signal inputted from time multiplexer 109, and transmits the signal subjected to the radio transmission processing to STA 200 via an antenna.

[Configuration Example of Downlink Radio Reception Apparatus 200]

Figure 7:
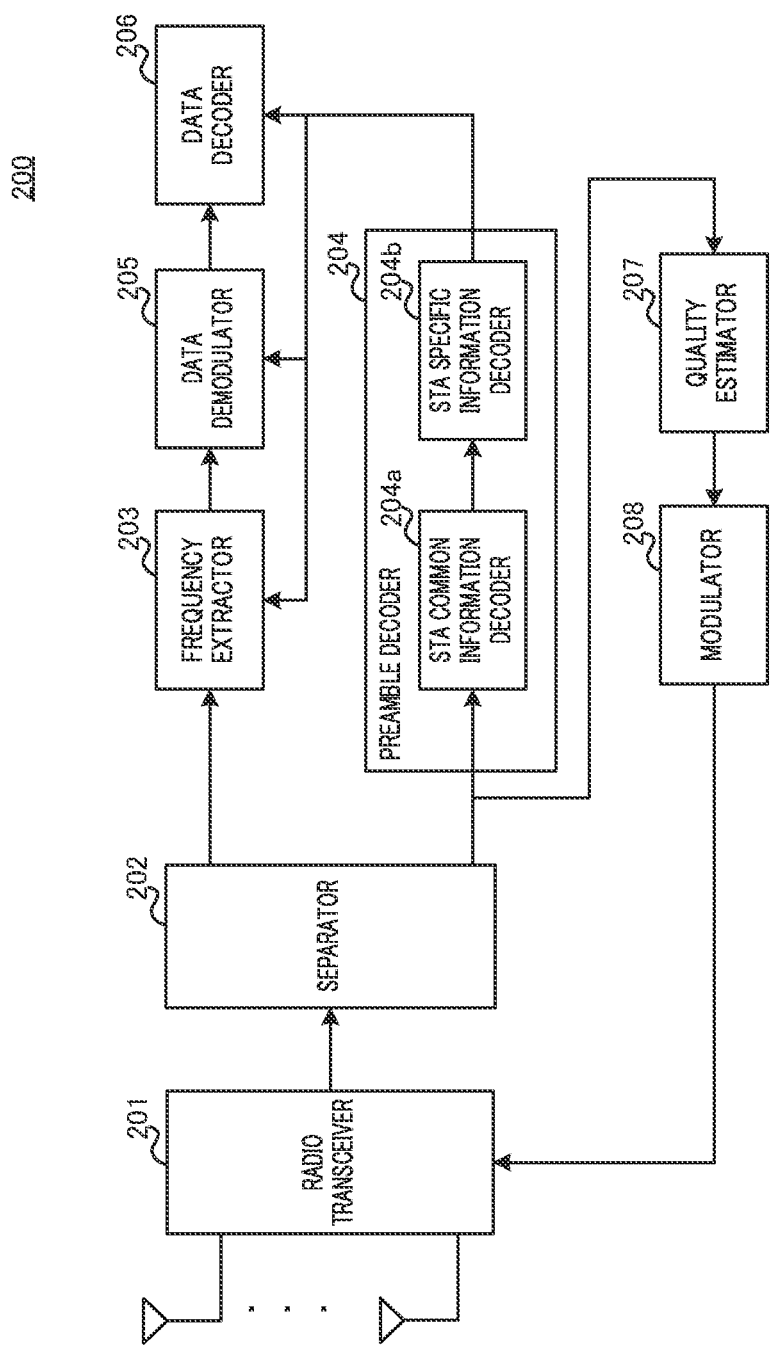
FIG. 7 is a block diagram illustrating a configuration example of a downlink radio reception apparatus according to Embodiment 1; 4

FIG. 7 is a block diagram illustrating a configuration example of downlink radio reception apparatus 200 (for example, STA 200) according to Embodiment 1.6 STA 200 illustrated in FIG. 7 includes, for example, radio transceiver 201, separator 202, frequency extractor 203, preamble decoder 204, data demodulator 205, data decoder 206, quality estimator 207, and modulator 208.

For example, STA 200 illustrated in FIG. 7 is an example of downlink radio reception apparatus 20 illustrated in FIG. 5. The controller illustrated in FIG. 5 may correspond to a processor (for example, preamble decoder 204 or the like) relating to decoding of a control signal and determination of an allocated RU based on a control signal in FIG. 7. Further, the radio receiver illustrated in FIG. 5 may correspond to radio transceiver 201 illustrated in FIG. 7, for example.

Radio transceiver 201 performs radio transmission processing including a D/A conversion, a frequency up-conversion to a carrier frequency, and the like on a transmission signal inputted from modulator 208, and transmits the signal subjected to the radio transmission processing to AP 100 via an antenna. Further, radio transceiver 201 performs radio reception processing including a down-conversion, an A/D conversion, and the like on a signal received via the antenna, and outputs the signal subjected to the radio reception processing to separator 202.

Separator 202 separates, in a time domain, data and a preamble from a signal subjected to the radio reception processing. Separator 202 outputs the data to frequency extractor 203 and outputs the preamble to preamble decoder 204 and quality estimator 207.

Preamble decoder 204 includes STA common information decoder 204a and STA specific information decoder 204b.

STA common information decoder 204a demodulates and decodes STA common information from a preamble inputted from separator 202, and extracts the STA common information. STA common information decoder 204a determines an allocated RU allocated to STA 200 in a channel bandwidth (for example, 20 MHz bandwidth) from an RU allocation pattern and unallocated RU information included in the extracted STA common information. Then, STA common information decoder 204a outputs information on the determined allocated RU to STA specific information decoder 204b. Further, STA common information decoder 204a extracts a signal including STA specific information from the preamble inputted from separator 202, and outputs the signal to STA specific information decoder 204b. Note that, the method of determining an allocated RU from an RU allocation pattern and unallocated RU information will be described later.

STA specific information decoder 204b demodulates and decodes STA specific information inputted from STA common information decoder 204a, and extracts the STA specific information. STA specific information decoder 204b decodes user fields included in the STA specific information and arranged in the order of allocated RUs, and determines whether STA IDs match an ID of the own terminal set in advance. STA specific information decoder 204b determines that a user field in which an ID matching the ID of the own terminal set in advance is set as an STA ID is control information addressed to the own terminal. STA specific information decoder 204b outputs STA specific control information included in the user field addressed to the own terminal to data demodulator 205 and data decoder 206. Further, STA specific information decoder 204b determines an allocated RU allocated to the own terminal based on the order of arrangement of pieces of the control information addressed to the own terminal and information on an allocated RU inputted from STA common information decoder 204a. STA specific information decoder 204b outputs the allocated RU allocated to the own terminal to frequency extractor 203.

Frequency extractor 203 extracts (demaps), from a reception signal that is transmitted using at least one RU and includes a signal(s) addressed to at least one STA, a reception data signal addressed to the own terminal, which is included in an allocated RU inputted from preamble decoder 204, and outputs the extracted data signal to data demodulator 205.

Data demodulator 205 performs processing including channel equalization, demodulation and the like on a data signal inputted from frequency extractor 203 based on control information (for example, an MCS, an encoding method, and the like) inputted from preamble decoder 204, and extracts demodulation data addressed to the own terminal. Data demodulator 205 outputs the extracted demodulation data to data decoder 206.

Data decoder 206 decodes desired data from demodulation data inputted from data demodulator 205 based on control information (for example, an MCS, an encoding method, and the like) inputted from preamble decoder 204.

Quality estimator 207 performs channel estimation based on a reference signal (for example, STF, LTF) included in a preamble inputted from separator 202, and generates radio quality information indicating at least one of radio qualities (for example, a frequency response and an SNR) estimated for each predetermined frequency resource. Quality estimator 207 outputs an uplink signal including the radio quality information to modulator 208.

Modulator 208 performs processing including IFFT processing, modulation and the like on a signal inputted from quality estimator 207, and generates an uplink signal (for example, a data signal, or referred to as "OFDM signal") subjected to the modulation. Modulator 208 outputs the uplink signal subjected to the modulation to radio transceiver 201. Note that, modulator 208 may perform processing including IFFT processing, modulation and the like on the uplink signal including data, control information, and the like.

[Operation Example of AP and STA]

Next, an operation example of AP 100 and STA 200 of the present embodiment will be described.

For example, in one PPDU header (also referred to as "preamble") including STA common information and STA specific information on a plurality of STAs 200 multiplexed by MU-MIMO or OFDMA, AP 100 includes unallocated RU information in the STA common information. The unallocated RU information is, for example, bitmap information indicating an unallocated RU and/or contiguous bandwidth information of an unallocated RU. Further, AP 100 transmits STA specific information including a user field associated with an allocated RU. Note that, the STA specific information in Embodiment 1 may not include a user field associated with an unallocated RU (for example, a user field in which an unused ID is included in a used ID field).

Hereinafter, a method of transmitting unallocated RU information in a format of control information for MU transmission in 11ax (for example, SIG-B in the case of DL MU transmission) will be described as an example.

FIG. 8 illustrates an example of a list of RU allocation pattern candidates. The list illustrated in FIG. 8 indicates allocation pattern candidates for RUs with respect to a minimum allocation granularity (26 tones in the case of 11ax). The list illustrated in FIG. 8 includes a plurality of patterns that differ from each other in at least one of the size per RU and the allocation (order of arrangement) of each RU with respect to nine RUs with the minimum allocation granularity, RU #1 to RU #9, in a channel bandwidth.

For example, in Pattern 0 of FIG. 8, the nine RUs with the minimum allocation granularity are defined as nine RUs without a size change. Further, in Pattern 1 of FIG. 8, RU #1 to RU #7 are defined as RUs without a size change, and RU #8 and RU #9 are defined as one RU having a size of 52 tones. In Pattern 3 of FIG. 8, RU #1 to RU #5 are defined as RUs without a size change, RU #6 and RU #7 are defined as one RU having a size of 52 tones, and RU #8 and RU #9 are defined as one RU having a size of 52 tones. In other words, seven RUs are defined in Pattern 3 of FIG. 8.

AP 100 selects one RU allocation pattern from among the RU allocation pattern candidates illustrated in FIG. 8, for example. Then AP 100 notifies information (N bits indices in FIG. 8) indicating the selected RU allocation pattern by an RU allocation field of STA common information. Further, AP 100 allocates RUs included in the selected RU allocation pattern to STAs. Then, AP 100 arranges pieces of STA specific information in accordance with the order in which the RUs included in the selected RU allocation pattern are allocated to the STAs. Further, AP 100 notifies information on, among the RUs included in the selected RU allocation pattern, an RU (unallocated RU), which is/are not allocated to any STA, by STA common information.

Hereinafter, an example of STA common information and an example of STA specific information in a case where AP 100 selects Pattern 2 of FIG. 8 and allocates the RUs of Pattern 2 to four STAs (STA #1 to STA #4) will be described.

Figure 9:
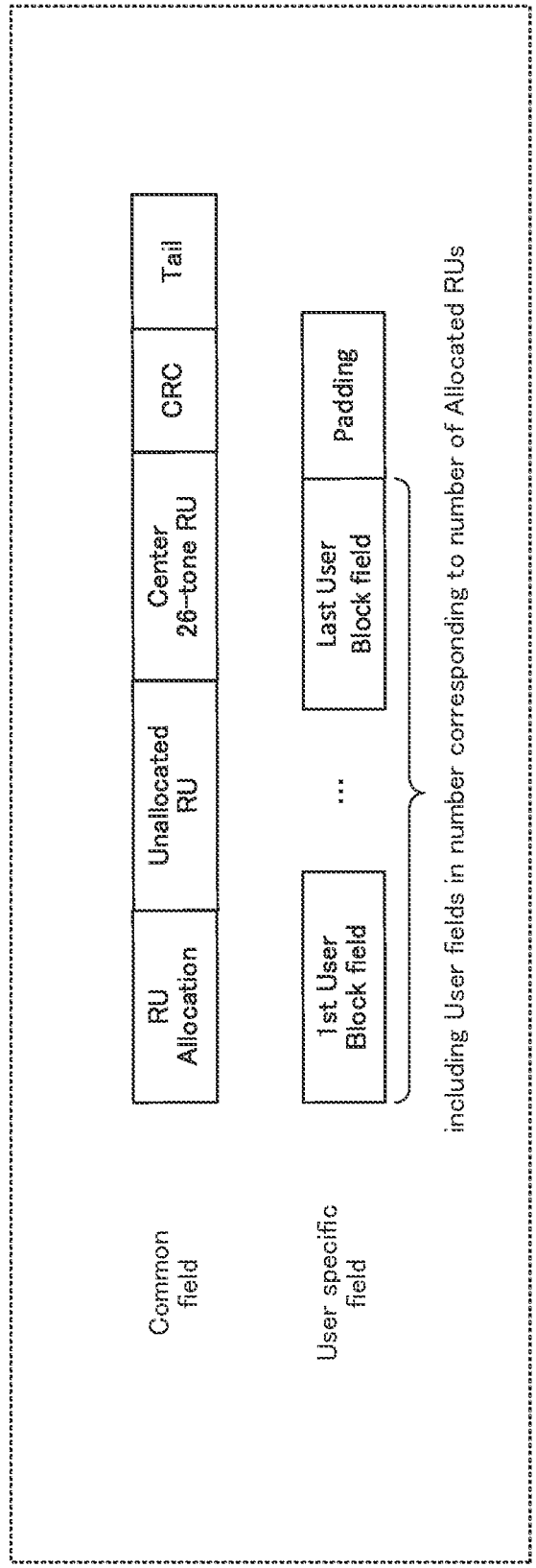
FIG. 9 illustrates an example of a format of a downlink multi-user (DL MU) signal in Embodiment 1.

FIG. 9 illustrates an example of a format of a DL MU signal in Embodiment 1. FIG. 9 indicates STA common information (common field) and STA specific information (user specific field). Note that, in FIG. 9, a description of the same fields and subfields as those in the STA common information and the STA specific information illustrated in FIG. 1 will be omitted.

The STA common information illustrated in FIG. 9 is provided with a subfield (unallocated RU subfield) that notifies information on an unallocated RU. Further, the STA specific information illustrated in FIG. 9 includes user fields in number corresponding to the number of allocated RUs (allocated RUs).

The unallocated RU field may be bit pattern information indicating whether an RU is an unallocated RU for each minimum allocation granularity (26 tones in the case in 11ax) of an RU allocation pattern.

FIG. 10 illustrates a first example of unallocated RU information. For example, as in the example of FIG. 10, an unallocated RU field may indicate whether an RU is an unallocated RU based on bit pattern information of 9 bits.

FIG. 10 indicates by an RU allocation field that the RU allocation pattern is Pattern 2 illustrated in FIG. 8 (the pattern in which 26-tone RUs are arranged in frequency bandwidths of RU #1 to RU #5, RU #8 and RU #9 and a 52-tone RU is arranged in frequency bandwidths of RU #6 and RU #7). Further, in FIG. 10, RU #1 is allocated to STA #1, RU #3 is allocated to STA #2, RU #6 and RU #7 are allocated to STA #3, and RU #9 is allocated to STA #4 in the RU allocation pattern of Pattern 2.

The unallocated RU field included in the STA common information indicates whether RU #1 to RU #9 are unallocated RUs. In the case of the example of FIG. 10, RU #2, RU #4, RU #5, and RU #8 are unallocated RUs, and the remaining RUs are allocated RUs. Accordingly, in a case where "1" is associated with the unallocated RUs and "0" is associated with the allocated RUs, the unallocated RU field indicates 9-bit bit pattern information of "010110010" as illustrated in FIG. 10. Note that, in this case, the RUs allocated to the STAs are arranged in the order of STA #1, STA #2, STA #3, and STA #4 in the RU allocation pattern. Accordingly, in the STA specific information (user specific field), user fields of the STAs are arranged in the order of STA #1, STA #2, STA #3, and STA #4.

Note that, information to be indicated in the unallocated RU field is not limited to a bit pattern described above. For example, the information may be information in which unallocated RUs are limited to contiguous RUs in an RU allocation pattern and unallocated RU information indicates "the start RU of the unallocated RUs and the number of contiguous unallocated RUs". Hereinafter, this example will be described.

FIG. 11 illustrates a second example of unallocated RU information.

In the same manner as in FIG. 10, FIG. 11 indicates by an RU allocation field that the RU allocation pattern is Pattern 2 illustrated in FIG. 8. Further, in FIG. 11, RU #1 is allocated to STA #1, RU #2 is allocated to STA #3, RU #8 is allocated to STA #2, and RU #9 is allocated to STA #4 in the RU allocation pattern of Pattern 2. In this case, RU #3 to RU #7 are unallocated RUs. In the example of FIG. 11, the unallocated RUs are contiguously arranged in the RU allocation pattern.

The unallocated RU field included in the STA common information indicates that the start RU of the unallocated RUs (RU #3 in FIG. 11) and the number of contiguous unallocated RUs (5 in FIG. 11). In this case, the size of the unallocated RU field may be 6 bits. Note that, in the example of FIG. 11, the RUs allocated to the STAs in the RU allocation pattern are arranged in the order of STA #1, STA #3, STA #2, and STA #4. Accordingly, in the STA specific information (user specific field), user fields of the STAs are arranged in the order of STA #1, STA #3, STA #2, and STA #4.

As exemplified in FIGS. 10 and 11, the user fields associated with the unallocated RUs are not included in STA specific information by including unallocated RU information in STA common information so that signaling of the STA specific information can be reduced. Accordingly, even in a case where Multi-AP coordination is applied, an unallocated RU can be dynamically notified with few overhead, and throughput can be improved.

Note that, the size of an unallocated RU field may be changed in accordance with the number of RUs in an RU allocation pattern to be notified. In a case where the size of an unallocated RU field configured to be variable, another information may be added to STA common information such that the entire size of the STA common information does not change.

Figure 12:
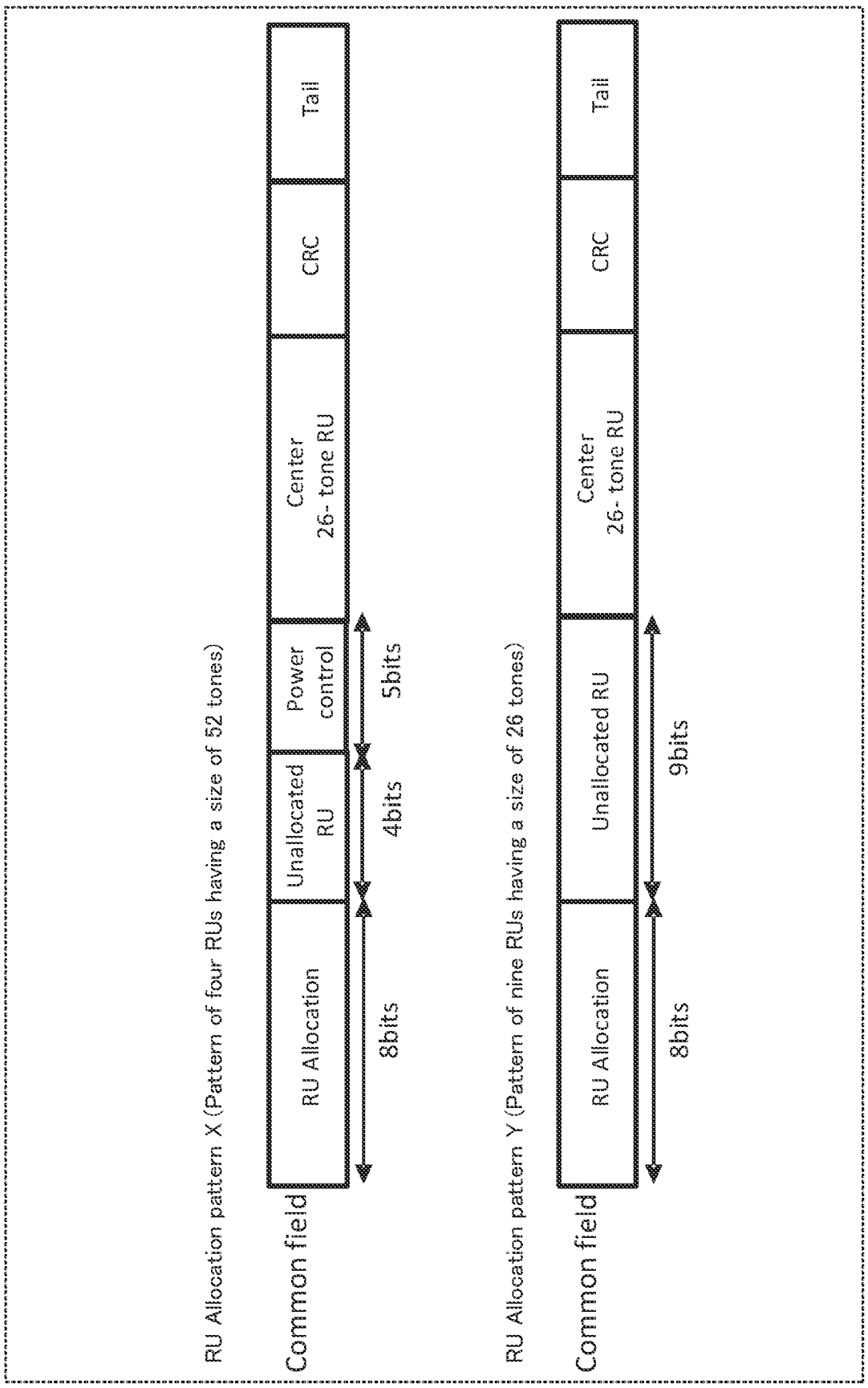
FIG. 12 illustrates an example of STA common information in a case where the size of an unallocated RU field is configured to be variable.

FIG. 12 illustrates an example of STA common information in a case where the size of an unallocated RU field is configured to be variable. FIG. 12 indicates an example of an RU allocation pattern that defines four RUs each of which has a size of 52 tones (hereinafter referred to as "RU allocation pattern X"), and an example of an RU allocation pattern that defines nine RUs each of which has a size of 26 tones (hereinafter referred to as "RU allocation pattern Y").

For example, as illustrated in FIG. 12, the maximum value of the size of an unallocated RU field may be defined as 9 bits, and when the size of the unallocated RU field is smaller than the maximum value, another information (for example, transmission power control information, or the like) may be included. In FIG. 12, in the RU allocation pattern X, for example, the size of an unallocated RU field is configured to be 4 bits and transmission power control information (power control) is included for 5 bits in STA common information. Further, in FIG. 12, in the case of the RU allocation pattern Y, the size of an unallocated RU field is configured to be 9 bits (maximum size). The total size of the STA common information may be fixed by such a size adjustment.

Further, the size of an unallocated RU field as bitmap information may be limited by limiting an unallocated RU size to equal to or larger than a predetermined value. For example, the unallocated RU size may be limited to equal to or larger than 52 tones, and the size of a bitmap may be reduced to 4 bits (the number of bits which is the same as the maximum number of RUs per channel bandwidth of 52 tones).

As described above, in Embodiment 1, information on an unallocated RU is notified by STA common information. This notification makes it possible to reduce signaling overhead associated with the notification so that more efficient control of Multi-AP coordination can be achieved.

Embodiment 2

In Embodiment 2, in the same manner as in Example 1, information on an unallocated RU is notified by STA common information. In Embodiment 2, the information on an unallocated RU is notified by a form different from that in Embodiment 1.

[Configuration Example of Downlink Radio Transmission Apparatus 300]

Figure 13:
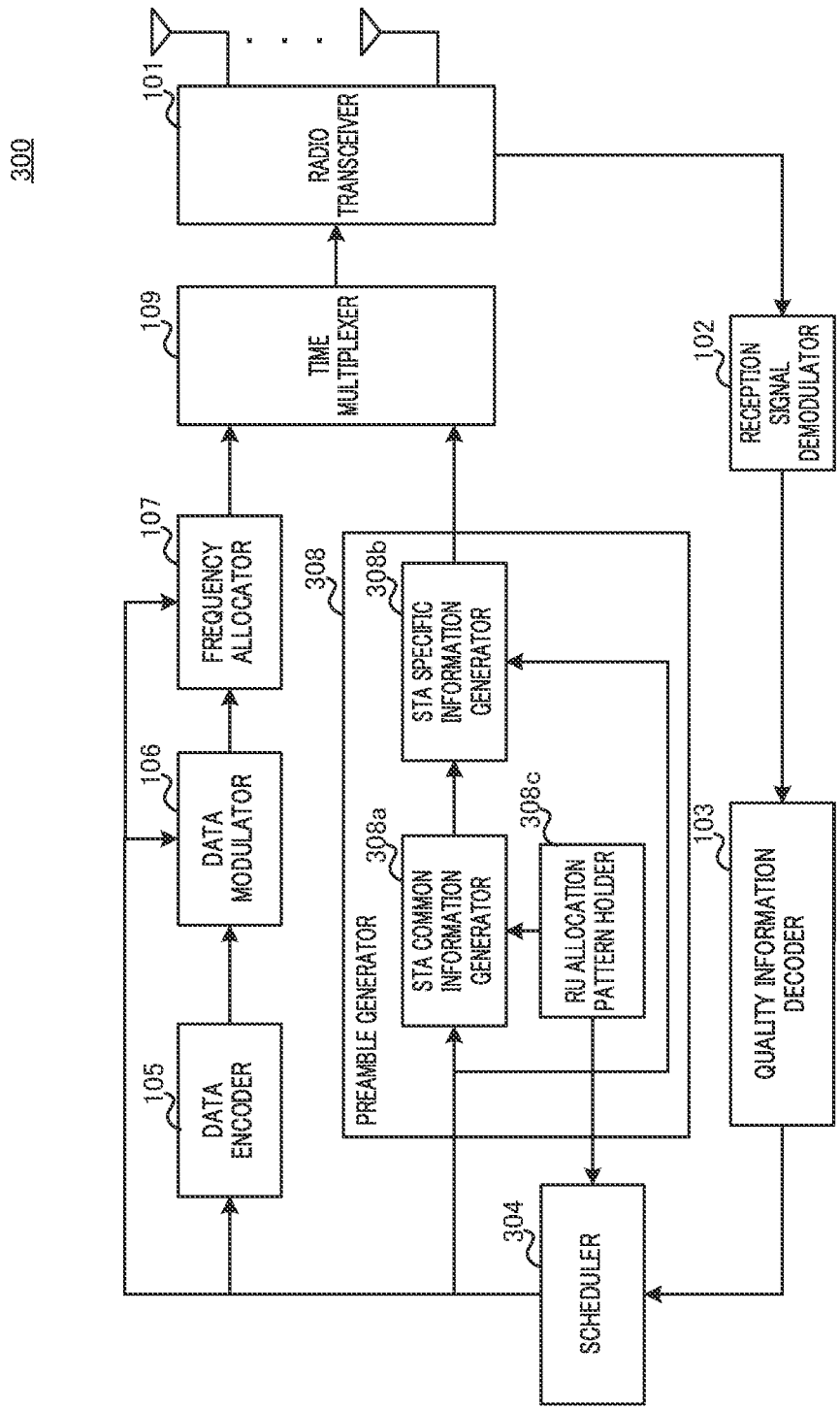
FIG. 13 is a block diagram illustrating a configuration example of a downlink radio transmission apparatus according to Embodiment 2.

FIG. 13 is a block diagram illustrating a configuration example of downlink radio transmission apparatus 300 (hereinafter referred to as "AP 300") according to Embodiment 2. Note that, in FIG. 13, the same configurations as those in FIG. 6 may be denoted with the same reference signs, and a description thereof may be omitted.

AP 300 illustrated in FIG. 13 has a configuration that scheduler 104 and preamble generator 108 of AP 100 illustrated in FIG. 6 are replaced with scheduler 304 and preamble generator 308, respectively.

For example, AP 300 illustrated in FIG. 13 is another example of downlink radio transmission apparatus 10 illustrated in FIG. 4. The controller illustrated in FIG. 4 may correspond to a processor (for example, scheduler 304, preamble generator 308, and the like) relating to the generation of a control signal in FIG. 13. Further, the radio transmitter illustrated in FIG. 4 may correspond to radio transceiver 101 illustrated in FIG. 13, for example.

Preamble generator 308 includes STA common information generator 308a, STA specific information generator 308b, and RU allocation pattern holder 308c. Preamble generator 308 generates a preamble including STA common information and STA specific information based on scheduling information (for example, the number of transmission terminals, an encoding method, an MCS, frequency allocation (including an unallocated RU) inputted from scheduler 304. Preamble generator 308 outputs the generated preamble to time multiplexer 109.

RU allocation pattern holder 308c holds RU allocation pattern candidates to be included in the STA common information. The RU allocation pattern candidates include an RU allocation pattern(s) including an unallocated RU. RU allocation pattern holder 308c outputs the held RU allocation pattern candidates to scheduler 304 and STA common information generator 308a.

Scheduler 304 determines an unallocated RU and an RU to be allocated to an STA(s) from among RU allocation pattern candidates including an unallocated RU to be defined by an RU allocation pattern, and outputs information on the determined unallocated and allocated RUs (scheduling information including frequency allocation information) to preamble generator 308 and frequency allocator 107. Note that, in a case where every RU defined in a channel bandwidth is allocated to an STA, scheduler 304 may not determine an unallocated RU.

STA common information generator 308a determines RU allocation pattern information (RU allocation field) to be included in the STA common information based on frequency allocation information from scheduler 304 and an RU allocation pattern held by RU allocation pattern holder 308c.

STA specific information generator 308b generates, based on scheduling information, STA specific information (for example, an STA ID, an MCS, and the like) on each STA to which a frequency resource is allocated. Note that, the STA specific control information on each STA to be MU-multiplexed is notified using user fields. The order of allocation (order of arrangement) of user fields for each STA in a preamble (for example, HE MU PPDU) may be defined in accordance with an RU allocation pattern. For example, user fields are arranged in accordance with the order in an RU allocation pattern except an unallocated RU(s).

STA specific information generator 308b generates a preamble by adding STA specific information to STA common information outputted from STA common information generator 308a, and outputs the preamble to time multiplexer 109.

[Configuration Example of Downlink Radio Reception Apparatus 400]

Figure 14:
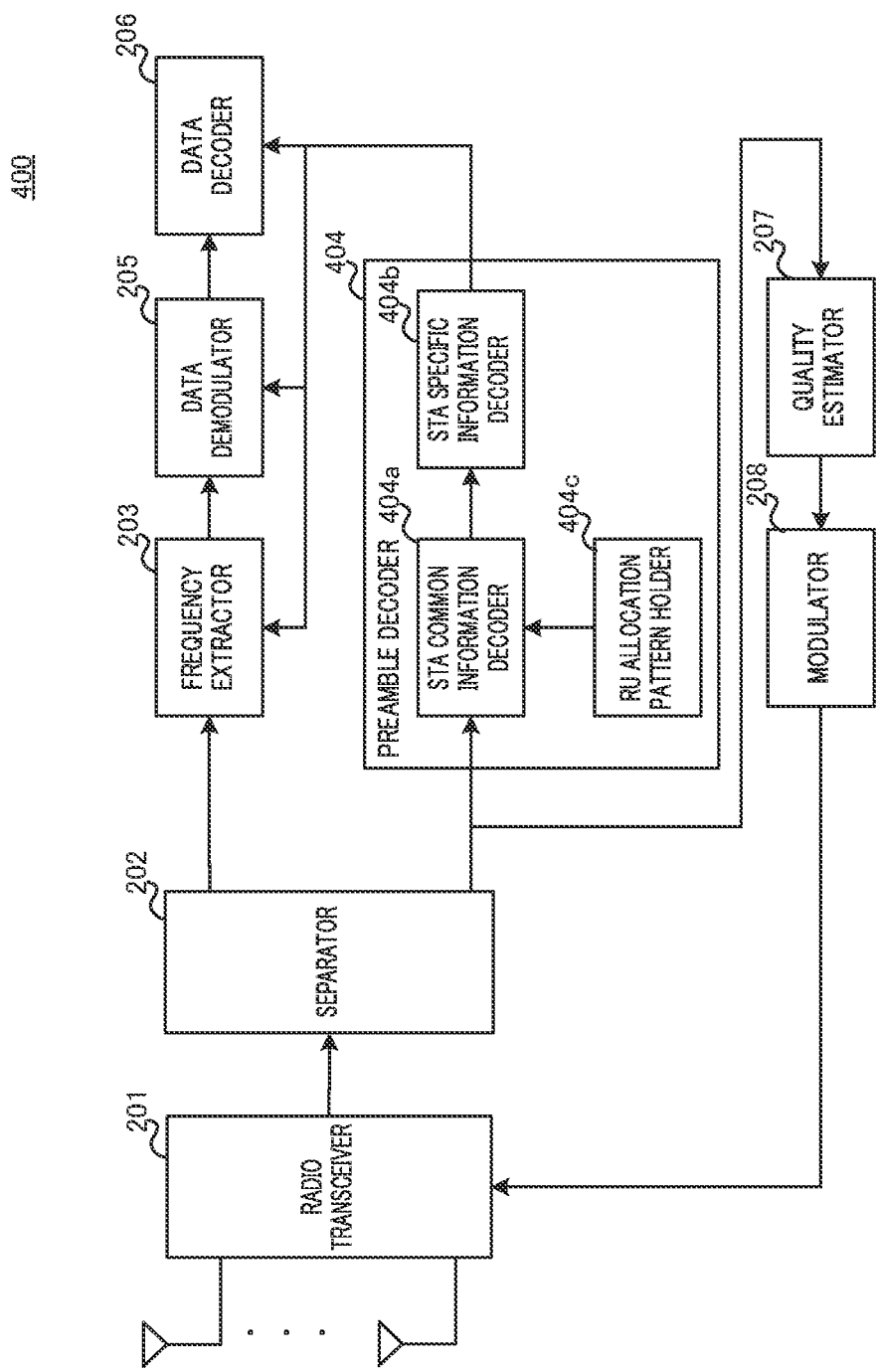
FIG. 14 is a block diagram illustrating a configuration example of a downlink radio reception apparatus according to Embodiment 2.

FIG. 14 is a block diagram illustrating a configuration example of downlink radio reception apparatus 400 (for example, STA 400) according to Embodiment 2. Note that, in FIG. 14, the same configurations as those in FIG. 7 may be denoted with the same reference signs, and a description thereof may be omitted.

STA 400 illustrated in FIG. 14 has a configuration in which preamble decoder 204 of STA 200 illustrated in FIG. 7 is replaced with preamble decoder 404.

For example, STA 400 illustrated in FIG. 14 is an example of downlink radio reception apparatus 20 illustrated in FIG. 5. The controller illustrated in FIG. 5 may correspond to a processor (for example, preamble decoder 404 or the like) relating to decoding of a control signal and determination of an allocated RU based on a control signal in FIG. 14. Further, the radio receiver illustrated in FIG. 5 may correspond to radio transceiver 201 illustrated in FIG. 14, for example.

Preamble decoder 404 includes STA common information decoder 404a, STA specific information decoder 404b, and RU allocation pattern holder 404c.

In the same manner as in RU allocation pattern holder 308c of downlink radio transmission apparatus 300 described above, RU allocation pattern holder 404c holds RU allocation pattern candidates including an RU allocation pattern(s) including an unallocated RU.

STA common information decoder 404a demodulates and decodes STA common information from a preamble inputted from separator 202, and extracts the STA common information. STA common information decoder 404a determines an allocated RU allocated to STA 400 and an unallocated RU in a channel bandwidth (for example, 20 MHz bandwidth) based on an RU allocation pattern included in the extracted STA common information and RU allocation pattern candidates held by RU allocation pattern holder 404c. Then, STA common information decoder 404a outputs information on the determined allocated RU and unallocated RU(s) to STA specific information decoder 404b. Further, STA common information decoder 404a extracts a signal including STA specific information from a preamble inputted from separator 202, and outputs the signal to STA specific information decoder 404b.

STA specific information decoder 404b demodulates and decodes STA specific information inputted from STA common information decoder 404a, and extracts the STA specific information. STA specific information decoder 404b decodes user fields, which are included in the STA specific information and are arranged in the order of allocated RUs, and determines whether STA IDs match an ID of the own terminal set in advance. STA specific information decoder 404b determines that a user field in which an ID matching the ID of the own terminal set in advance is set as an STA ID is control information addressed to the own terminal. STA specific information decoder 404b outputs STA specific control information included in the user field addressed to the own terminal to data demodulator 205 and data decoder 206. Further, STA specific information decoder 404b outputs an allocated RU allocated to the own terminal to frequency extractor 203.

As described above, in Embodiment 1, an unallocated RU field provided separately from RU allocation pattern information (RU allocation field) indicates unallocated RU information. In Embodiment 2, RU allocation pattern candidates include an RU allocation pattern(s) including an unallocated RU so that an RU allocation pattern(s) indicated by RU allocation pattern information indicates (specifies) an unallocated RU(s).

[Operation Example of AP and STA]

Next, an operation example of AP 300 and STA 400 of the present embodiment will be described.

Hereinafter, a method of transmitting unallocated RU information in a format of control information for MU transmission in 11ax (for example, SIG-B in the case of DL MU transmission) will be described as an example.

Figure 15:
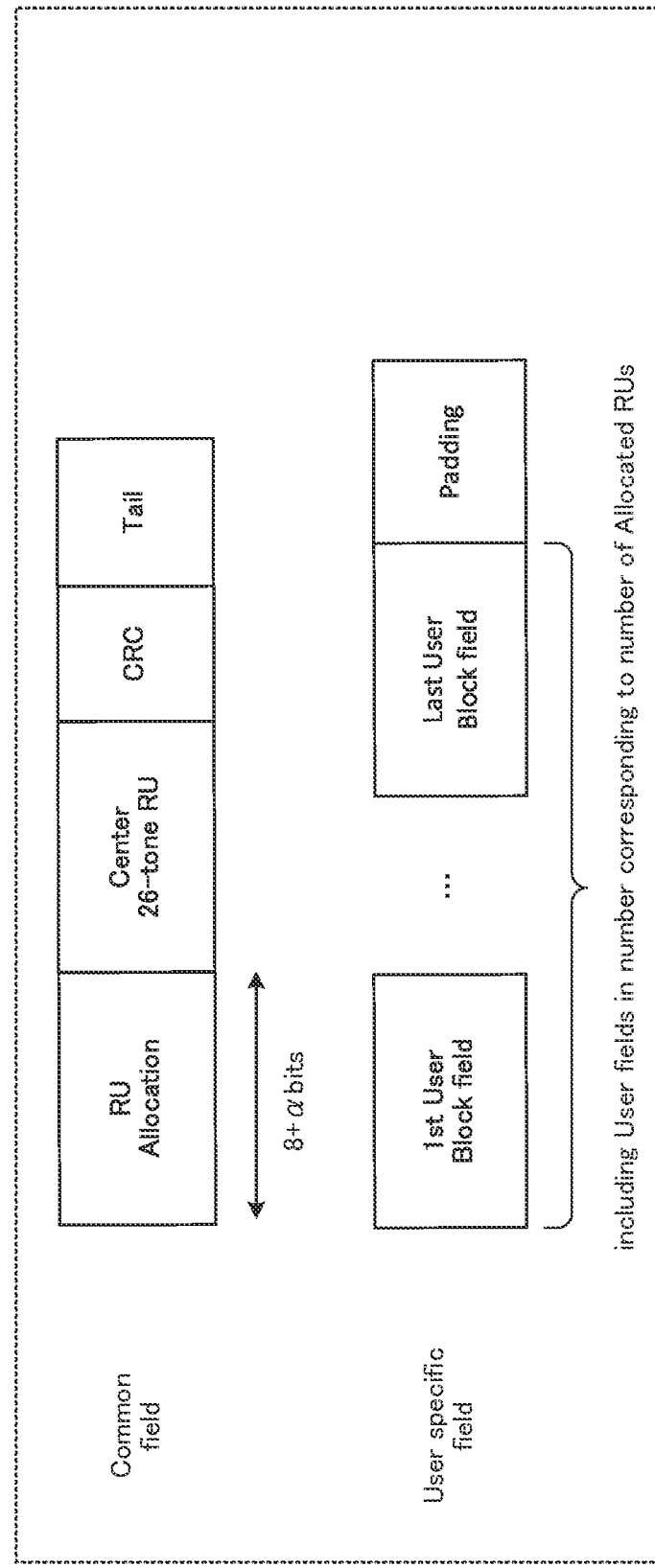
FIG. 15 illustrates an example of a format of a DL MU signal in Embodiment 2.

FIG. 15 illustrates an example of a format of a DL MU signal in Embodiment 2. FIG. 15 indicates STA common information (common field) and STA specific information (user specific field). Note that, in FIG. 15, a description of the same fields and subfields as those in the STA common information and the STA specific information illustrated in FIG. 1 will be omitted.

The STA common information illustrated in FIG. 15 includes the same fields and subfields as those in the STA common information illustrated in FIG. 1, but allocation RU pattern information (for example, RU allocation subfield) included in the STA common information notifies STA 400 of an RU allocation pattern including an unallocated RU.

FIG. 16 illustrates a first example of a list of RU allocation pattern candidates in Embodiment 2. In the same manner as in FIG. 8. FIG. 16 indicates allocation pattern candidates for RUs with respect to a minimum allocation granularity (26 tones in the case in 11ax). However, the RU allocation pattern candidates illustrated in FIG. 16 include RU allocation patterns including an unallocated RU.

For example, as in one example of FIG. 16, the RU allocation patterns including an unallocated RU included in the RU allocation pattern candidates are all patterns in which the total size of the unallocated RU is equal to or larger than a predetermined value (for example, 26×4 tones or larger) or are limited to a pattern or some patterns of the all patterns.

FIG. 17 illustrates a second example of a list of RU allocation pattern candidates in Embodiment 2. In the same manner as in FIG. 8. FIG. 17 indicates allocation pattern candidates for RUs with respect to a minimum allocation granularity (26 tones in the case in 11ax). However, the RU allocation pattern candidates illustrated in FIG. 17 include RU allocation patterns an including unallocated RU.

For example, as in one example of FIG. 17, the RU allocation patterns including an unallocated RU included in the RU allocation pattern candidates are all patterns in which the size of a set of contiguous unallocated RUs is equal to or larger than a predetermined value (for example, at least 106 tones) or are limited to a pattern or some patterns of the all patterns.

Note that, the RU allocation patterns including an unallocated RU may be all patterns in which the number of contiguous unallocated RUs that form a set of contiguous unallocated RUs is equal to or larger than a predetermined value (for example, at least three) or may be limited to a pattern or some patterns of the all patterns.

Note that, with respect to the RU allocation patterns including unallocated an RU, there may be no limitation on the size, number, positions and/or the like of the unallocated RUs.

As illustrated in FIGS. 16 and 17, unallocated RU information can be notified by an RU allocation field of STA common information by defining an RU allocation pattern(s) including an unallocated RU among RU allocation pattern candidates. Further, as illustrated in FIGS. 16 and 17, the number of RU allocation pattern candidates can be limited by limiting an RU allocation pattern(s) including an unallocated RU included in the RU allocation pattern candidates based on the number, size, position(s), and/or the like of the unallocated RU(s) so that signaling overhead can be reduced.

For example, preferentially including an RU allocation pattern(s) with a large number of unallocated RUs in RU allocation pattern candidates makes it possible to increase an overhead reducing effect with respect to a method of notifying a user field(s) associated with an unallocated RU(s). Further, coordinated transmission with rough frequency allocation granularity can be preferentially carried out and a scheduler and feedback control can be simplified by preferentially including an RU allocation pattern(s) with unallocated RUs having a large size in RU allocation pattern candidates as in FIG. 17. Since a scheduler and feedback control can be simplified, it is possible to reduce complexity of implementation.

Note that, in a case where an unallocated RU that is not included in an RU allocation pattern is notified, it is possible to notify the unallocated RU by using a user field in which an unused AID is set to an STA ID field in the same manner as in the prior art so that a decrease in the degree of freedom of scheduling can be suppressed.

Note that, RU allocation pattern candidates including an RU allocation pattern(s) including an unallocated RU may be defined for each BSS (AP) by notifying a plurality of STAs within the coverage of an AP with a beacon or the like. Further, a plurality of RU allocation pattern candidates (for example, the lists illustrated in FIGS. 16 and 17) may be defined with specifications (specs) and dynamic switching may be performed by notifying numbers of the RU allocation pattern candidates to be used for a plurality of STAs within the coverage of an AP with a beacon or the like in accordance with the communication situation. For example, a suitable RU allocation pattern can be set in accordance with the communication situation, such as the number of STAs within the coverage in a coordinated BSS.

Further, RU allocation pattern candidates including an RU allocation pattern(s) including an unallocated RU may be defined separately from conventional RU allocation pattern candidates defined in 11ax (for example, FIG. 8). Alternatively, an RU allocation pattern(s) including an unallocated RU may be replaced with a conventional RU allocation pattern(s) defined in 11ax.

As described above, in Embodiment 2, unallocated RU information is notified by STA common information in the same manner as in Embodiment 1. In Embodiment 2, however, unallocated RU information is notified by an RU allocation field of STA common information. This notification makes it possible to reduce signaling overhead associated with the notification so that more efficient control of Multi-AP coordination can be achieved.

Embodiment 3

In Embodiment 3, it is selected between a case where unallocated RU information is notified by STA common information and a case where unallocated RU information is notified by STA specific information.

[Configuration Example of Downlink Radio Transmission Apparatus 500]

Figure 18:
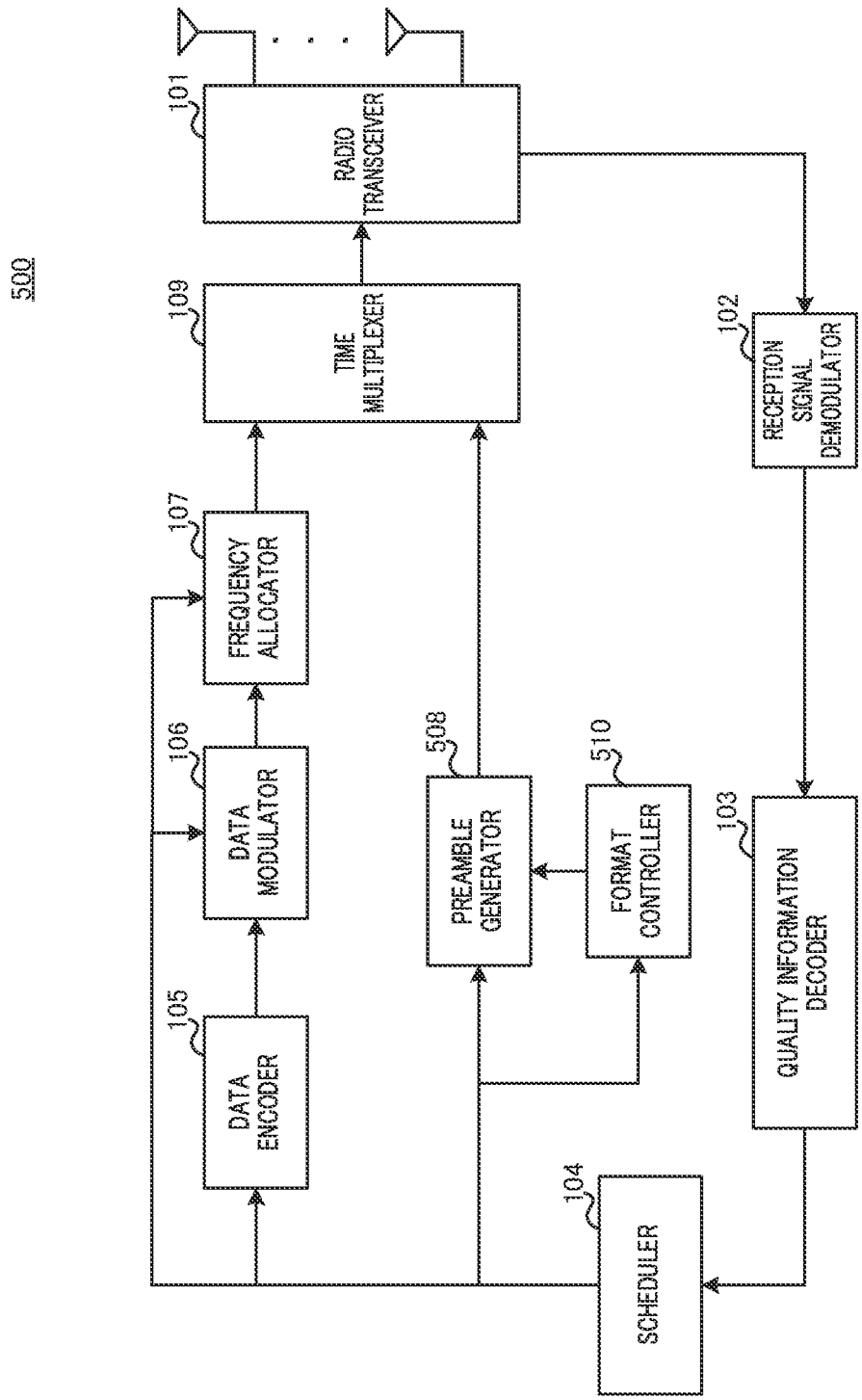
FIG. 18 is a block diagram illustrating a configuration example of a downlink radio transmission apparatus according to Embodiment 3.

FIG. 18 is a block diagram illustrating a configuration example of downlink radio transmission apparatus 500 (for example, AP 500) according to Embodiment 3. Note that, in FIG. 18, the same configurations as those in FIG. 6 may be denoted with the same reference signs, and a description thereof may be omitted.

Downlink radio transmission apparatus 500 illustrated in FIG. 18 has a configuration in which preamble generator 108 of downlink radio transmission apparatus 100 illustrated in FIG. 6 is replaced with preamble generator 508 and format controller 510 is added.

Format controller 510 determines, based on allocated RU and unallocated RU information from scheduler 104, whether the allocated RU and unallocated RU information is included in STA common information or in STA specific information. Then, format controller 510 performs, based on the determination, control to switch a format of a preamble. Format controller 510 instructs a format of a preamble to preamble generator 508. Note that, the format switching control method by format controller 510 will be described later.

Preamble generator 508 generates, based on an instruction of format controller 510, a preamble to which a format for notifying RU allocation information including allocated and unallocated RUs is applied. Preamble generator 508 includes information (for example, referred to as "RU allocation format") for instructing the applied format to STA 600 in STA common information. For example, the RU allocation format is included in STA common information such as HE-SIG-A (see FIG. 1). Note that, the HE-SIG-A includes control information for demodulating HE-SIG-B. Note that, the RU allocation information may be the same as or different from RU allocation pattern information described above.

[Configuration Example of Downlink Radio Reception Apparatus 600]

Figure 19:
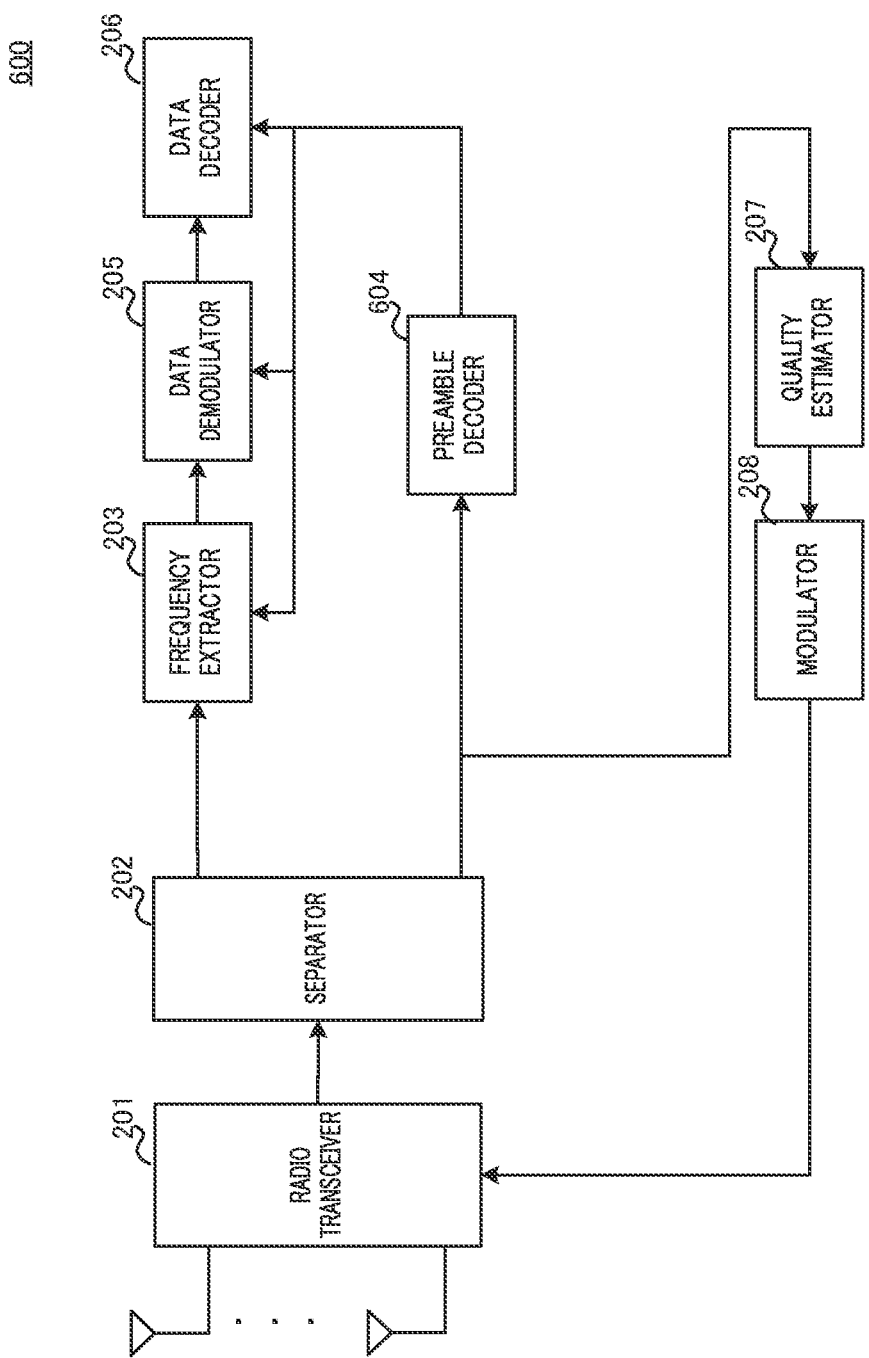
FIG. 19 is a block diagram illustrating a configuration example of a downlink radio reception apparatus according to Embodiment 3.

FIG. 19 is a block diagram illustrating a configuration example of downlink radio reception apparatus 600 (for example, STA) according to Embodiment 3. Note that, in FIG. 19, the same configurations as those in FIG. 7 may be denoted with the same reference signs, and a description thereof may be omitted.

Downlink radio reception apparatus 600 illustrated in FIG. 19 has a configuration in which preamble decoder 204 of downlink radio reception apparatus 200 illustrated in FIG. 7 is replaced with preamble decoder 604.

Preamble decoder 604 determines, for example, a format of control information (for example, HE-SIG-B) including allocated RU and unallocated RU information from format information (RU allocation format) included in STA common information (for example, HE-SIG-A) of a received preamble. Then, preamble decoder 604 decodes control information (an allocated RU, an MCS, and the like) addressed to the own terminal in accordance with the determined format.

[Operation Example of AP and STA]

Next, an operation example of AP 500 and STA 600 of the present embodiment will be described.

Hereinafter, a method of switching a format including an allocated RU in a format of control information for MU transmission in 11ax (for example, SIG-B in the case of DL MU transmission) will be described as an example.

For example, format controller 510 of AP 500 selects a format with less overhead in accordance with the number of allocated RUs and the number of unallocated RUs from scheduler 104.

Figure 20:
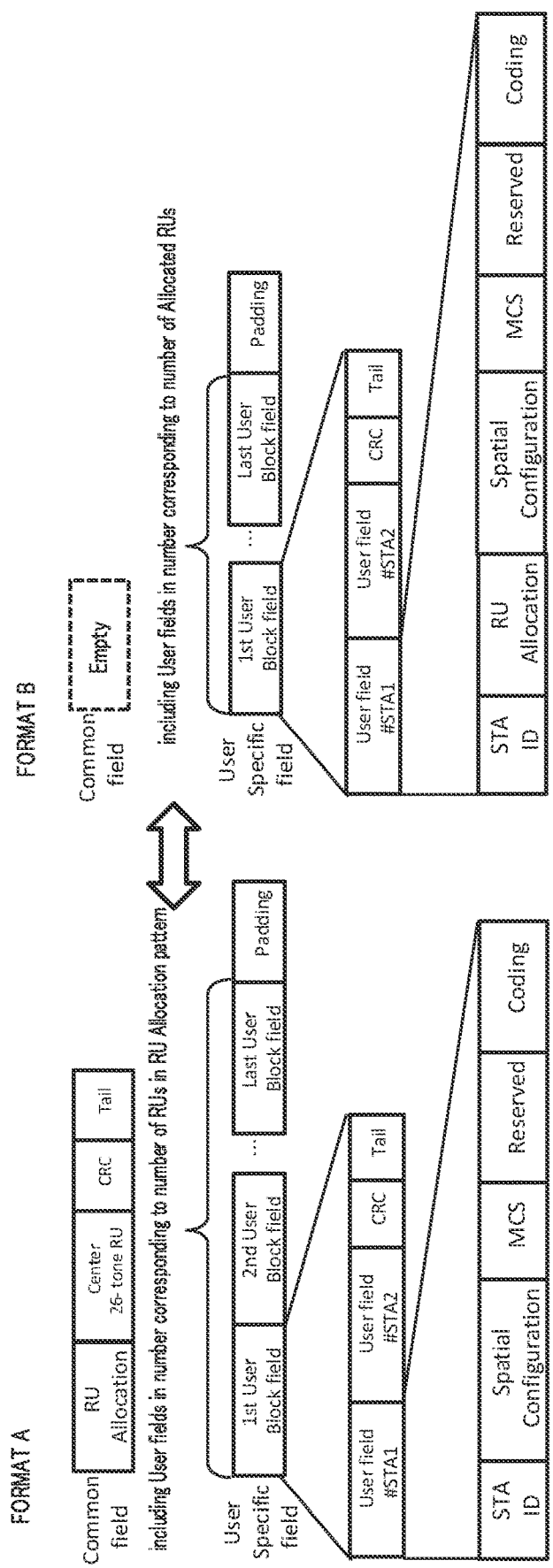
FIG. 20 illustrates exemplary formats of a preamble to be selected in Embodiment 3.

FIG. 20 illustrates exemplary formats of a preamble to be selected in Embodiment 3. FIG. 20 illustrates two formats of Format A and Format B.

An RU allocation pattern notified by an RU allocation field of Format A is determined, for example, from among the RU allocation pattern candidates illustrated in FIG. 8. Further, STA specific information of Format A includes user fields in number corresponding to the number of RUs included in the RU allocation pattern. In this case, an unallocated RU is indicated (specified) by setting an unused AID to an STA ID field of a user field.

For example, in a case where the number of unallocated RUs is large (in a case where the number of allocated RUs is small), format controller 510 selects Format B. In Format B, user fields in number corresponding to the number of allocated RUs are included in STA specific information. Further, RU allocation information (RU allocation field) is included not in STA common information, but in a user field of the STA specific information. Note that, the RU allocation information included in the STA specific information is configured to be information indicating not an RU allocation pattern of an entire channel bandwidth, but RU arrangements of STAs corresponding to the user fields (for example, the information may be the same as terminal specific RU allocation information used in a Trigger frame in 11ax).

The terminal specific RU allocation information may be bitmap information indicating whether an RU is an allocated RU or an unallocated RU for each minimum allocated RU size. Alternatively, it may be a method in which allocation to STAs is limited to contiguous bandwidth allocation and the start RU number and the number of contiguous allocated RUs are notified.

In a case where the number of unallocated RUs is large, the number of user fields is small so that an increase in overhead can be suppressed even when STA specific information includes RU allocation information as indicated in Format B.

In a case where the number of unallocated RUs is small (in a case where the number of allocated RUs is large), on the other hand, format controller 510 selects Format A. In Format A, in the same manner as in 11ax, RU allocation information is included in STA common information, and user fields in number corresponding to the number of RUs defined by the RU allocation information are included in STA specific information. Further, in Format A, in the same manner as in 11ax, an unallocated RU is indicated by setting an unused AID to an STA ID field.

In a case where the number of allocated RUs is large, the number of user fields is large so that an increase in overhead is suppressed by including RU allocation information in STA common information as indicated in Format A.

As described above, in Embodiment 3, signaling overhead can be reduced by controlling a format in accordance with allocated and unallocated RUs.

Note that, the embodiments described above may be used in combination.

For example, Embodiments 1 and 2 may be combined. In the case of this combination, an unallocated RU included in an RU allocation pattern formed of RUs having a size equal to or larger than a predetermined value may be notified by bitmap information in an unallocated RU field as indicated in Embodiment 1. On the other hand, an unallocated RU included in an RU allocation pattern formed of RUs having a size smaller than a predetermined value may be notified by the RU allocation pattern including the unallocated RU as indicated in Embodiment 2.

Further, for example, Embodiments 1 and 3 may be combined. An example of this combination will be described with reference to FIG. 21.

Figure 21:
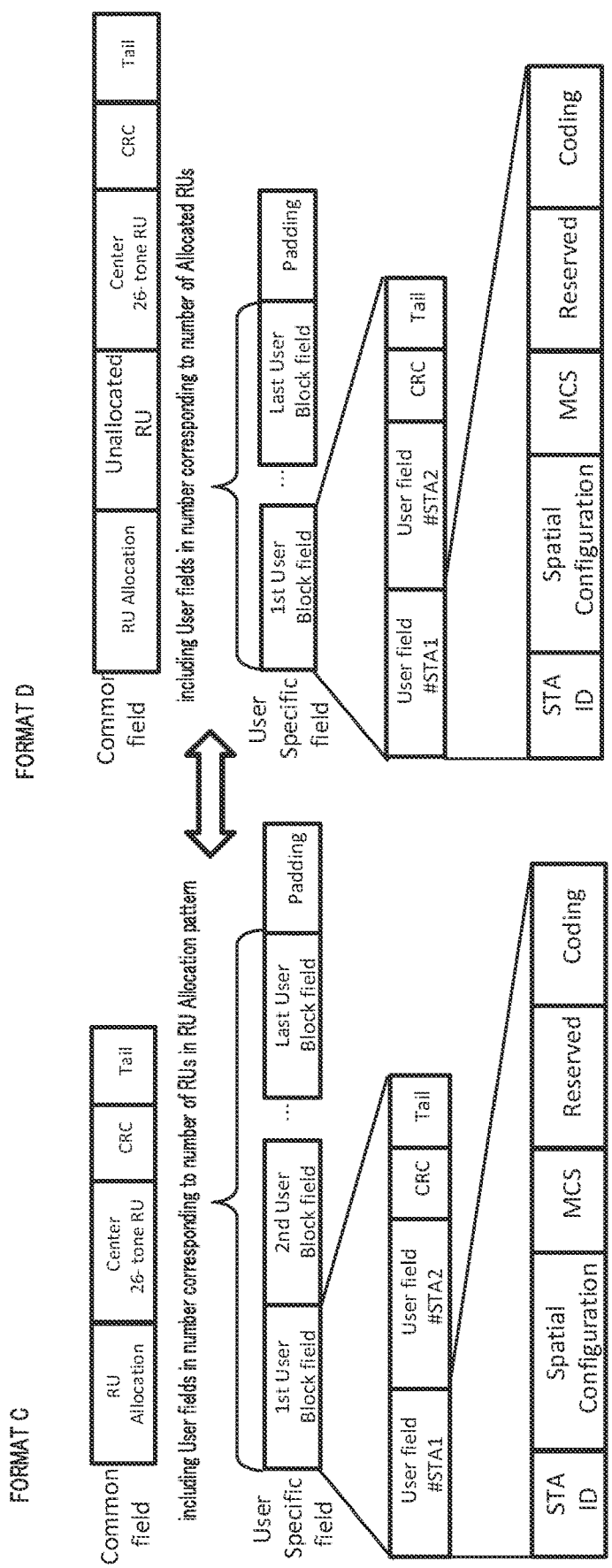
FIG. 21 illustrates exemplary formats of a preamble to be selected.

FIG. 21 illustrates exemplary formats of a preamble to be selected. FIG. 21 indicates two formats of Format C and Format D. Format C is the same format as in 11ax. In Format D, as in Embodiment 1, an unallocated RU field including information for specifying an unallocated RU is included in STA common information, and user fields in number corresponding to the number of allocated RUs are included in STA specific information.

In a case where the number of unallocated RUs is smaller than a predetermined value, a format (HE-SIG-B) which is the same as in 11ax may be selected as in Format C. In this case, an unallocated RU may be notified by setting an unused AID to an STA ID field of a user field without providing an unallocated RU field in STA common information. Here, the predetermined value may be 1 or may be a value larger than 1.

In a case where the number of unallocated RUs is equal to or larger than a predetermined value, a format including an unallocated RU field is applied as in Format D. In Format D, for example, the unallocated RUs may be notified by an unallocated RU field included in STA common information as illustrated in Embodiment 1.

Information indicating these formats is included in, for example, STA common information (for example, HE-SIG-A) and is notified as in Embodiment 3.

The embodiments of the present disclosure have been described thus far.

Other Embodiments

In the embodiments described above, configuration examples based on a format of a control signal for MU transmission in 11ax have been described as an example, but the format to which an embodiment of the present disclosure is applied is not limited to the format in 11ax. An embodiment of the present disclosure can be applied, for example, to MU transmission that is controlled by using STA common information and STA specific information.

For example, a format of a control signal instructing MU transmission is not limited to the format defined in 11ax (for example, SIG-B or trigger frame).

Further, the formats indicated in the embodiments described above are exemplary, and the present disclosure is not limited thereto. For example, one or some of the fields and subfields included in the formats indicated in the embodiments described above may be omitted, a field(s) and/or a subfield(s) that notifies/notify another information may be added, and/or an order(s) of arrangement of fields and subfields may be changed. Further, the terms "field" and "subfield" may be interchanged.

Further, the names of the pieces of information and the fields indicated in the embodiments described above are exemplary and the present disclosure is not limited thereto.

Further, the "RU allocation" in the embodiments described above refers to, for example, allocation (size, position, and/or order of arrangement) of RUs in a frequency bandwidth (channel bandwidth). The "allocated RU" refers to, for example, an RU that is allocated to a user (for example, an STA). The "unallocated RU" refers to, for example, an RU that is not allocated to a user (for example, an STA).

Further, in the embodiments described above, an example in which STA common information is a "common field" of SIG-B and user specific information is a "user specific field" of SIG-B has been indicated, but the present disclosure is not limited thereto. For example, STA common information may be included in another field of a preamble (for example, a field included in SIG-A).

In the embodiments described above, the case where the downlink radio transmission apparatus is an AP and the downlink radio reception apparatus is an STA has been described. However, the downlink radio transmission apparatus and the downlink radio reception apparatus are not limited thereto.

Note that, the notation " . . . section" or "-er, -or, and -ar" in the embodiments described above may be replaced with another notation such as " . . . circuitry", " . . . device", " . . . unit" or " . . . module".

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (for example, cellular (cell) phone, smart phone), a tablet, a personal computer (PC) (for example, laptop, desktop, netbook), a camera (for example, digital still/video camera), a digital player (digital audio/video player), a wearable device (for example, wearable camera, smart watch, tracking device), a game console, a digital book reader, a telehealth/telemedicine (remote health and medicine) device, and a vehicle providing communication functionality (for example, automotive, airplane, ship), and various combinations thereof.

The communication apparatus is not limited to be portable or movable, and may also include any kind of apparatus, device or system being non-portable or stationary, such as a smart home device (for example, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to an embodiment of the present disclosure includes: control circuitry, which, in operation, generates common information and user specific information; and transmission circuitry, which, in operation, transmits a control signal including the common information and the user specific information. The common information is information common to a plurality of users and including information on an unallocated resource. The user specific information is specific to each of the plurality of users.

In an embodiment of the present disclosure, the common information includes information indicating an allocation pattern of resources in a frequency bandwidth, and the user specific information includes information indicating a number corresponding to a number of the resources allocated to the plurality of users in the allocation pattern.

In an embodiment of the present disclosure, the common information includes information indicating the unallocated resource in the allocation pattern, and the information indicating the unallocated resource indicates a position of a resource not allocated to any of the plurality of users in the allocation pattern.

In an embodiment of the present disclosure, the control circuitry determines the allocation pattern from among a plurality of allocation pattern candidates including an allocation pattern including the unallocated resource.

In an embodiment of the present disclosure, the allocation pattern including the unallocated resource is a pattern in which a total size of the unallocated resource is equal to or larger than a predetermined value.

In an embodiment of the present disclosure, the allocation pattern including the unallocated resource is a pattern in which a number of the unallocated resources contiguous in the frequency bandwidth is equal to or larger than a predetermined value.

In an embodiment of the present disclosure, the allocation pattern including the unallocated resource is a pattern in which a size of one or a plurality of the unallocated resources contiguous in the frequency bandwidth is equal to or larger than a predetermined value.

In an embodiment of the present disclosure, the control circuitry selects one of a first format and a second format, and the transmission circuitry transmits the control signal of a format selected between the first format and the second format. In the first format, the information on the unallocated resource is included in the common information common to the plurality of users. In the second format, the information on the unallocated resource is included in the user specific information specific to each of the plurality of users.

A base station according to an embodiment of the present disclosure includes: control circuitry, which, in operation, selects one of a first format and a second format; and transmission circuit, which, in operation, transmits a control signal of a format selected between the first format and the second format. In the first format, information on an unallocated resource is included in common information common to a plurality of users. In the second format, the information on the unallocated resource is included in user specific information specific to each of the plurality of users.

In an embodiment of the present disclosure, the control signal includes the common information including information indicating the selected format.

A transmission method according to an embodiment of the present disclosure includes: generating, by a base station, common information and user specific information; and transmitting, by the base station, a control signal including the common information and the user specific information. The common information is information common to a plurality of users and including information on an unallocated resource. The user specific information is specific to each of the plurality of users.

A reception method according to an embodiment of the present disclosure includes: receiving, by a terminal, a control signal that includes common information common to a plurality of users and including information on an unallocated resource, and user specific information specific to each of the plurality of users; and determining, by the terminal, a resource allocated to the terminal based on the information on the unallocated resource.

The disclosure of Japanese Patent Application No. 2019-139824, filed on Jul. 30, 2019, including the specification, drawings and abstract, is incorporated herein by reference in its entirety.

INDUSTRIAL APPLICABILITY

An embodiment of the present disclosure is useful in a radio communication system.

REFERENCE SIGNS LIST 10, 100, 300, 500 Downlink radio transmission apparatus (AP)
20, 200, 400, 600 Downlink radio reception apparatus (STA)
101, 201 Radio transceiver
102 Reception signal demodulator
103 Quality information decoder
104, 304 Scheduler
105 Data encoder
106 Data modulator
107 Frequency allocator
108, 308, 508 Preamble generator
108a, 308a STA common information generator
108b, 308b STA specific information generator
109 Time multiplexer
202 Separator
203 Frequency extractor
204, 404, 604 Preamble decoder
204a, 404a STA common information decoder
204b, 404b STA specific information decoder
205 Data demodulator
206 Data decoder
207 Quality Estimator
208 Modulator
308c, 404c RU allocation pattern holder
510 Format controller

The invention claimed is:

1. A base station, comprising:

control circuitry, which, in operation, generates common information and user specific information, the common information being information common to a plurality of users and including information on an unallocated resource and information indicating an allocation pattern of resources in a frequency bandwidth, the user specific information being specific to each of the plurality of users and including information indicating a number corresponding to a number of the resources allocated to the plurality of users in the allocation pattern; and transmission circuitry, which, in operation, transmits a control signal including the common information and the user specific information.

2. The base station according to claim 1, wherein:

the common information includes information indicating the unallocated resource in the allocation pattern, and the information indicating the unallocated resource indicates a position of a resource not allocated to any of the plurality of users in the allocation pattern.

3. The base station according to claim 1, wherein the control circuitry determines the allocation pattern from among a plurality of allocation pattern candidates including an allocation pattern including the unallocated resource.

4. The base station according to claim 3, wherein the allocation pattern including the unallocated resource is a pattern in which a total size of the unallocated resource is equal to or larger than a predetermined value.

5. The base station according to claim 3, wherein the allocation pattern including the unallocated resource is a pattern in which a number of the unallocated resources contiguous in the frequency bandwidth is equal to or larger than a predetermined value.

6. The base station according to claim 3, wherein the allocation pattern including the unallocated resource is a pattern in which a size of one or a plurality of the unallocated resources contiguous in the frequency bandwidth is equal to or larger than a predetermined value.

7. The base station according to claim 1, wherein:

the control circuitry selects one of a first format and a second format, the first format being a format in which the information on the unallocated resource is included in the common information common to the plurality of users, the second format being a format in which the information on the unallocated resource is included in the user specific information specific to each of the plurality of users, and the transmission circuitry transmits the control signal of a format selected between the first format and the second format.

8. The base station according to claim 7, wherein the control signal includes the common information including information indicating the selected format.

9. A transmission method, comprising:

generating, by a base station, common information and user specific information, the common information being information common to a plurality of users and including information on an unallocated resource and information indicating an allocation pattern of resources in a frequency bandwidth, the user specific information being specific to each of the plurality of users and including information indicating a number corresponding to a number of the resources allocated to the plurality of users in the allocation pattern; and transmitting, by the base station, a control signal including the common information and the user specific information.

* * * * *